United States Patent
Kotake et al.

(10) Patent No.: US 10,590,001 B2
(45) Date of Patent: Mar. 17, 2020

(54) AEROGEL COMPOSITE, AND SUPPORTING MEMBER AND HEAT INSULATION MATERIAL PROVIDED WITH AEROGEL COMPOSITE

(71) Applicant: HITACHI CHEMICAL COMPANY, LTD., Tokyo (JP)

(72) Inventors: Tomohiko Kotake, Tokyo (JP); Masato Miyatake, Tokyo (JP); Hikari Murai, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/514,435

(22) PCT Filed: Sep. 25, 2015

(86) PCT No.: PCT/JP2015/077060
§ 371 (c)(1),
(2) Date: Mar. 24, 2017

(87) PCT Pub. No.: WO2016/047740
PCT Pub. Date: Mar. 31, 2016

(65) Prior Publication Data
US 2017/0283269 A1    Oct. 5, 2017

(30) Foreign Application Priority Data

Sep. 25, 2014 (JP) ................. 2014-195234
Oct. 31, 2014 (JP) ................. 2014-222353

(51) Int. Cl.
*C01B 33/158*    (2006.01)
*C08G 77/04*    (2006.01)
(Continued)

(52) U.S. Cl.
CPC ............ *C01B 33/1585* (2013.01); *B32B 9/00* (2013.01); *C01B 33/158* (2013.01); *C08G 77/04* (2013.01);
(Continued)

(58) Field of Classification Search
CPC .................................... C01B 33/1585
See application file for complete search history.

(56) References Cited

U.S. PATENT DOCUMENTS 4,402,927 A    9/1983    von Dardel et al.
5,496,527 A    3/1996    Yokogawa et al.
(Continued)

FOREIGN PATENT DOCUMENTS

CN    1730388 A    2/2006
JP    2000-026609 A    1/2000
(Continued)

OTHER PUBLICATIONS

International Search Report for PCT/JP2015/077060 dated Nov. 10, 2015; English translation submitted herewith (3 pages).
(Continued)

*Primary Examiner* — Alexandre F Ferre
(74) *Attorney, Agent, or Firm* — Fitch, Even, Tabin & Flannery, LLP

(57) ABSTRACT

The invention relates to an aerogel composite comprising an aerogel component and a silica particle, and being superior in thermal insulation properties and flexibility.

17 Claims, 6 Drawing Sheets

(51) Int. Cl.
    *C08J 9/28*     (2006.01)
    *B32B 9/00*     (2006.01)
    *C08K 3/36*     (2006.01)
    *C08L 83/04*     (2006.01)
    *C08G 77/06*     (2006.01)

(52) U.S. Cl.
    CPC ............... *C08J 9/28* (2013.01); *C08G 77/06* (2013.01); *C08K 3/36* (2013.01); *C08L 83/04* (2013.01)

(56) References Cited

U.S. PATENT DOCUMENTS

| | | | |
|---|---|---|---|
| 6,492,014 B1 * | 12/2002 | Rolison | B01J 13/0091 423/338 |
| 2006/0239886 A1 * | 10/2006 | Nakayama | B01J 19/123 423/335 |
| 2009/0104401 A1 | 4/2009 | Nakanishi et al. | |
| 2009/0247655 A1 | 10/2009 | Kim et al. | |

FOREIGN PATENT DOCUMENTS

| | | | | |
|---|---|---|---|---|
| JP | 2001-294418 | A | 10/2001 | |
| JP | 2011-093744 | A | 5/2011 | |
| JP | 2012-233110 | A | 11/2012 | |
| JP | 5250900 | B2 | 7/2013 | |
| JP | 2014-035043 | A | 2/2014 | |
| WO | 2007/010949 | A1 | 1/2007 | |
| WO | WO-2013118940 | A1 * | 8/2013 | ............ C04B 28/02 |
| WO | 2014/132652 | A1 | 9/2014 | |

OTHER PUBLICATIONS

International Preliminary Report on Patentability (IPRP) for WO Patent Application No. PCT/JP2015/077060 dated Apr. 6, 2017 in English.

* cited by examiner (a)

(b)

(c)

(a) (b)

AEROGEL COMPOSITE, AND SUPPORTING MEMBER AND HEAT INSULATION MATERIAL PROVIDED WITH AEROGEL COMPOSITE

TECHNICAL FIELD

The present invention relates to an aerogel composite, and a supporting member and a heat insulation material provided with an aerogel composite.

BACKGROUND ART

As a material having thermal insulation properties with a low thermal conductivity coefficient, a silica aerogel has been known. A silica aerogel is useful as a performance material having superior performance (thermal insulation properties, etc.), unique optical properties, unique electrical properties, etc., and has been used, for example, as an electronic substrate material utilizing an ultra-low dielectric constant characteristic of a silica aerogel, a thermal insulation material utilizing high thermal insulation properties of a silica aerogel, a light reflection material utilizing an ultra-low refractive index of a silica aerogel, etc.

As a method for producing such a silica aerogel, a supercritical drying method has been known, by which a gel compound (alcogel) obtained by hydrolysis of an alkoxysilane and followed by polymerization is dried under a supercritical condition of a dispersing medium (for example, refer to Patent Literature 1). A supercritical drying method is a method for removing a solvent contained in an alcogel by placing an alcogel and a dispersing medium (a solvent for drying) in a high pressure container, and transferring the dispersing medium into a supercritical fluid by applying a temperature and a pressure at or above a critical point thereof. Since, however, a supercritical drying method requires a high pressure process, a large capital investment in special equipment resistant to supercritical conditions, or the like is necessary, and further a lot of time and efforts are necessary.

Therefore, a technique for drying an alcogel using a general purpose method not requiring a high pressure process has been proposed. As such a method, for example, a method, by which a monoalkyltrialkoxysilane and a tetraalkoxysilane are used in a combination at a specific ratio as a gel source material such that an alcogel obtained may have an improved strength, and may be dried at a normal pressure (for example, refer to Patent Literature 2). However, when such normal pressure drying is used, a gel tends to contract due to a stress caused by capillary force in the alcogel.

CITATION LIST

Patent Literature

Patent Literature 1: U.S. Pat. No. 4,402,927
Patent Literature 2: Japanese Unexamined Patent Publication No. 2011-93744

SUMMARY OF INVENTION

Technical Problem

As described above, with respect to the drawbacks in conventional production processes, investigations from various viewpoints have been carried out. Meanwhile, when either of the above processes is used, an obtained aerogel is hard to handle, and scaling up is difficult, and therefore there remains a drawback in productivity. For example, a bulk aerogel obtained by the process may be broken only by a trial to lift the same by hand. It is presumed that this occurs due to a low density of an aerogel, and a pore structure of an aerogel, for which fine particles in a size of approx. 10 nm are linked only weakly.

As a technique for mitigating such drawbacks of a conventional aerogel, a method is conceivable, by which flexibility is imparted to a gel by increasing the pore diameter of a gel more or less to a micrometer order. However, there occurs a problem that the thermal conductivity coefficient of an aerogel obtained by such a method is increased remarkably, and superior thermal insulation properties of aerogel are lost.

The present invention was made in view of the above circumstances, with an object to provide an aerogel composite superior in thermal insulation properties and flexibility. The present invention provides also a supporting member with an aerogel composite prepared by carrying the aerogel composite, and a thermal insulation material.

Solution to Problem

The inventors diligently studied in order to achieve the objects, and as the result found that an aerogel composite, which hybridizes a silica particle in an aerogel, can develop superior thermal insulation properties and flexibility.

The present invention provides an aerogel composite comprising an aerogel component, and a silica particle. Different from an aerogel obtained by a conventional art, an aerogel composite according to the present invention is superior in thermal insulation properties and flexibility.

An aerogel composite may have a three-dimensional network skeleton constituted with the aerogel component and the silica particle, and pores. In this way, it becomes easier to improve the thermal insulation properties and flexibility.

The present invention provides also an aerogel composite comprising a silica particle as a component constituting a three-dimensional network skeleton. A thus obtained aerogel composite is superior in thermal insulation properties and flexibility.

The present invention provides also an aerogel composite prepared by drying a wet gel formed from a sol comprising a silica particle, and at least one selected from the group consisting of a silicon compound having a hydrolyzable functional group in the molecule, and a hydrolysis product of the silicon compound. A thus obtained aerogel composite is superior in thermal insulation properties and flexibility.

In this regard, the above aerogel composite may be also prepared by drying a wet gel formed from a sol comprising a silica particle, and at least one selected from the group consisting of a silicon compound having a hydrolyzable functional group in the molecule, and a hydrolysis product of the silicon compound.

According to the present invention the sol may further comprise at least one selected from the group consisting of a polysiloxane compound having a reactive group in the molecule, and a hydrolysis product of the polysiloxane compound. In this way, further improved thermal insulation properties and flexibility may be achieved.

The average primary particle diameter of the silica particle may be 1 to 500 nm. In this way, it becomes easier to improve the thermal insulation properties and flexibility.

In this case the shape of the silica particle may be spherical. Further, the silica particle may be an amorphous silica particle, and the amorphous silica particle may be at least one selected from the group consisting of a fused silica particle, a fumed silica particle, and a colloidal silica particle. In this way, further improved thermal insulation properties and flexibility may be achieved.

In this regard, the drying may be conducted at a temperature and at the atmospheric pressure less than a critical point of a solvent used for the drying. In this way, it becomes easier to improve the thermal insulation properties and flexibility.

The present invention provides further a supporting member with an aerogel composite comprising the aerogel composite, and a supporting member to carry the aerogel composite. Since the aerogel composite has superior thermal insulation properties and flexibility, superior thermal insulation properties and such superior bendability as is hardly achievable by a conventional aerogel can be developed according to the present invention.

The present invention provides further a thermal insulation material comprising the aerogel composite. Since the aerogel composite has superior thermal insulation properties and flexibility, a thermal insulation material according to the present invention can develop superior thermal insulation properties and such superior bendability as is hardly achievable by a conventional thermal insulation material.

Advantageous Effects of Invention

An aerogel composite superior in thermal insulation properties and flexibility may be provided according to the present invention. Namely, an aerogel composite, which exhibits superior thermal insulation properties, and achieves an improved handling property, such that scaling up becomes possible and the productivity may be enhanced, may be provided. As described above, an aerogel composite superior in thermal insulation properties and flexibility has the possibility of being utilized in various uses. The present invention can further provide a supporting member with an aerogel composite carrying such an aerogel composite as well as a thermal insulation material. In this regard, an important point of the present invention is that a control of thermal insulation properties and flexibility becomes easier than a conventional aerogel. This was not achievable by a conventional aerogel, with which it was necessary to sacrifice thermal insulation properties for acquiring flexibility, or to sacrifice flexibility for acquiring thermal insulation properties. In this regard, the expression "superior in thermal insulation properties and flexibility" does not necessarily mean that values representing both the characteristics are high, rather the expression includes, for example, such cases as "flexibility is superior, while keeping favorable thermal insulation properties", or "thermal insulation properties are superior, while keeping favorable flexibility".

DESCRIPTION OF EMBODIMENTS

Figure 1:
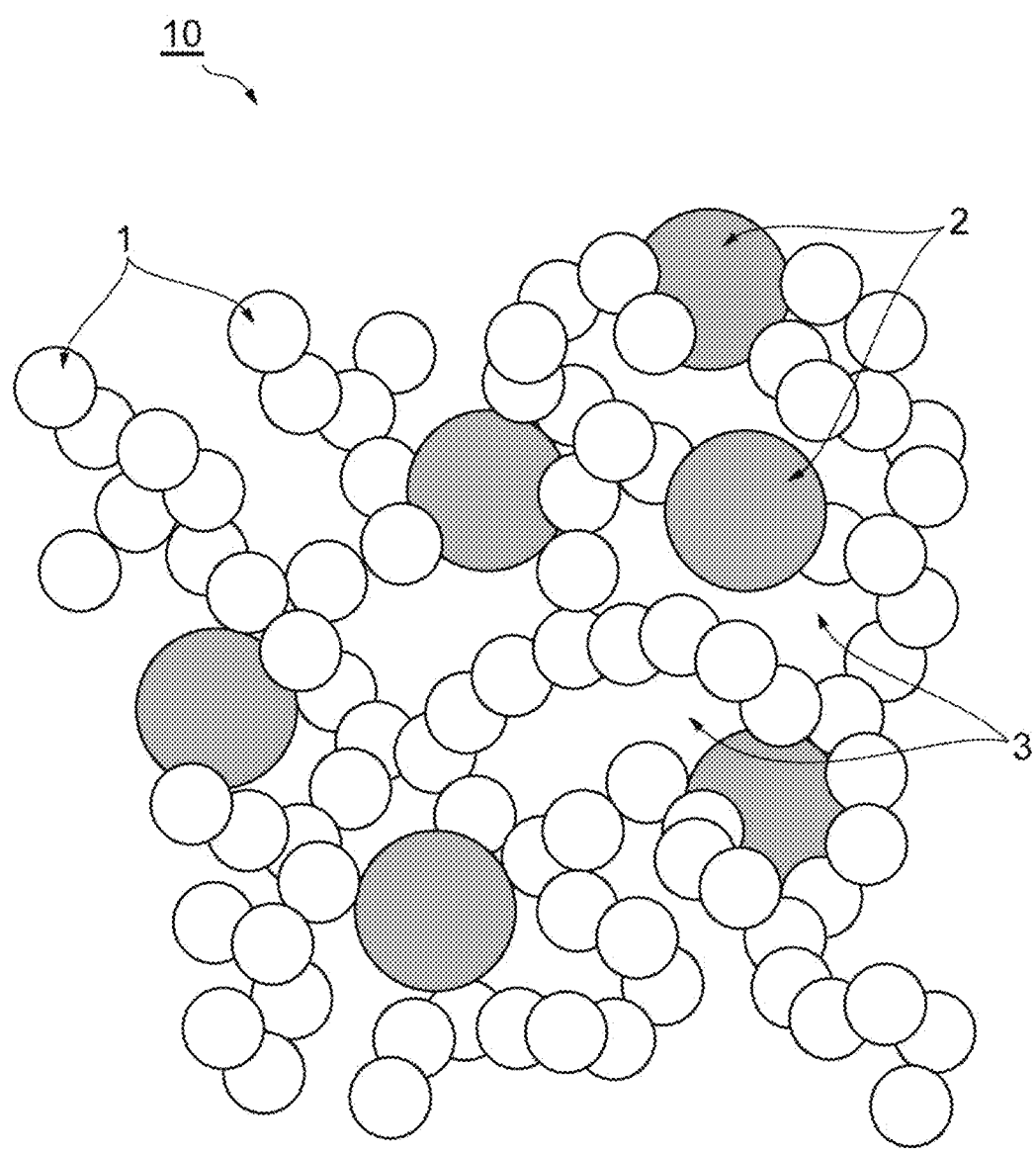
FIG. 1 is a schematic view showing a microstructure of an aerogel composite according to an Embodiment of the present invention.

A favorable Embodiment of the present invention will be described below in detail occasionally with reference to a drawing, provided that the present invention be not limited to the following Embodiment.

<Aerogel Composite>

In a narrow sense, a dried gel obtained by a supercritical drying method from a wet gel is called as aerogel, a dried gel obtained by drying at the atmospheric pressure therefrom is called as xerogel, and a dried gel obtained by freeze-drying therefrom is called as cryogel, however in this Embodiment a low density dried gel obtained from a wet gel without using the above drying techniques is called as aerogel. In other words, aerogel in the Embodiment means aerogel in a broad sense, namely "Gel comprised of a microporous solid in which the dispersed phase is a gas". Generally the inside of an aerogel is configured as a networked microstructure, having a cluster structure in which approx. 2 to 20-nm aerogel particles are bonded together. There are pores in a size less than 100 nm among skeletons formed by the clusters to constitute a three-dimensional microporous structure. In this regard, an aerogel according to the Embodiment is a silica aerogel containing silica as a main component. Examples of a silica aerogel include a so-called organic-inorganic hybridized silica aerogel, in which an organic group such as a methyl group, or an organic chain is introduced. An aerogel composite according to the Embodiment, in which a silica particle is hybridized in an aerogel, still maintains a cluster structure characterizing the aerogel, and has a three-dimensional microporous structure.

An aerogel composite according to the Embodiment comprises an aerogel component and a silica particle. It is also possible to express that an aerogel composite according to the Embodiment contains a silica particle as a component to constitute a three-dimensional network skeleton, although the concept may not be identical. An aerogel composite according to the Embodiment is superior in thermal insulation properties and flexibility as described below. Especially, owing to superior flexibility the handling property of an aerogel composite is improved and scaling up becomes possible so that the productivity can be enhanced. Such an aerogel composite may be obtained by making a silica particle present in a production environment for an aerogel. Advantages of presence of a silica particle are not limited to improvement of the thermal insulation properties, and flexibility, etc. of the composite itself, but also relevant to possibility of time reduction for a step of preparing a wet gel described below, or simplification of a step of washing and solvent replacement through a step of drying. In this regard, time reduction of a step and simplification of steps are not necessarily required for producing an aerogel composite superior in flexibility.

According to the Embodiment, there are various modes with respect to hybridization of an aerogel component and a silica particle. For example, an aerogel component may be in an indefinite shape such as a film form, or in a particle form (aerogel particle). It is presumed that flexibility is imparted to the skeleton of a composite, because in either mode, an aerogel component is present among silica particles taking various shapes.

First, as an example of a hybridization mode for an aerogel component and a silica particle, a mode, in which an aerogel component with an indefinite shape is present among silica particles, may be mentioned. There are various specific examples of the mode, including a mode in which a silica particle is coated with an aerogel component (silicone) in a film form (a mode in which an aerogel component contains a silica particle); a mode in which silica particles are bound together by an aerogel component as a binder; a mode in which a plurality of silica particle gaps are filled with an aerogel component; and a mode combining the modes (such as a mode in which silica particles arranged in a cluster form are coated with an aerogel component). As described above, in an aerogel composite according to the Embodiment, a three-dimensional network skeleton may be constituted with a silica particle and an aerogel component (silicone), and there is no particular restriction on a specific mode (form) thereof.

Meanwhile, as described below, an aerogel component may take a shape other than an indefinite shape, and may be hybridized with a silica particle taking a clear particle form as in FIG. 1.

Although a mechanism creating such various modes with respect to an aerogel composite according to the Embodiment is not very certain, the inventors conjecture that a formation rate of an aerogel component in a gelation step has an influence. For example, by changing the number of silanol groups in a silica particle, the formation rate of an aerogel component tends to be changed. Further, also by changing the pH of a system, the formation rate of an aerogel component tends to be changed.

This suggests that the mode of an aerogel composite (size, shape, etc. of a three-dimensional network skeleton) may be regulated by tuning the size, shape, and number of silanol groups of a silica particle, and the pH of a system. Therefore, it is conceivable that regulation of the density, porosity, etc. of an aerogel composite becomes possible, so that the thermal insulation properties and flexibility of an aerogel composite can be regulated. A three-dimensional network skeleton of an aerogel composite may be configured solely with one of the above various modes, or configured with two or more of the modes.

An aerogel composite according to the Embodiment will be described below by way of FIG. 1 as an example, provided that the present invention be not limited to the mode of FIG. 1 as described above. In this regard, matters common to any of the above modes (such as the type, size, and content of a silica particle) may be appropriately referred to the following descriptions.

FIG. 1 is a schematic view showing a microstructure of an aerogel composite according to an Embodiment of the present invention. As shown in FIG. 1, an aerogel composite 10 has a three-dimensional network skeleton formed by aerogel particles 1, which constitute an aerogel component, stringing randomly and three-dimensionally partly through the intermediary of a silica particle 2, and pores 3 surrounded by the skeleton. In this case, it is conjectured that a silica particle 2 exists among aerogel particles 1 and functions as a skeleton support for supporting a three-dimensional network skeleton. Therefore, it is conceived that an appropriate strength may be imparted to an aerogel, while maintaining the thermal insulation properties and flexibility of an aerogel, owing to existence of such a structure. Meanwhile, according to the Embodiment, an aerogel composite may have a three-dimensional network skeleton formed by silica particles stringing randomly and three-dimensionally through the intermediary of an aerogel particle. Further, a silica particle may be coated with aerogel particles. Since the aerogel particle (aerogel component) is comprised of silicone, it is conjectured that its affinity for a silica particle is high. This is conceivably a reason why a silica particle was successfully introduced in a three-dimensional network skeleton of an aerogel according to the Embodiment. In this regard, it is conceived that a silanol group on a silica particle contributes also to the affinity between the two.

It is conceived that an aerogel particle 1 is in a mode of a secondary particle constituted with a plurality of primary particles, and is more or less spherical. The average particle diameter of an aerogel particle 1 (namely, diameter of a secondary particle) may be set at 2 nm to 50 μm, may be also at 5 nm to 2 μm, or at 10 nm to 200 nm. When the average particle diameter of an aerogel particle 1 is 2 nm or more, an aerogel composite superior in flexibility becomes available more easily; meanwhile, when the average particle diameter is 50 μm or less, an aerogel composite superior in thermal insulation properties becomes available more easily. The average particle diameter of primary particles constituting an aerogel particle 1 may be 0.1 nm to 5 μm from the viewpoint of easier formation of a secondary particle with a low density porous structure, may be also 0.5 nm to 200 nm, and also 1 nm to 20 nm.

There is no particular restriction on a silica particle 2, and, for example, an amorphous silica particle may be used. Further, examples of the amorphous silica particle include at least one selected from the group consisting of a fused silica particle, a fumed silica particle, and a colloidal silica particle. Among the above, a colloidal silica particle has high monodispersity and therefore aggregation in a sol can be suppressed easily. In this regard, a silica particle 2 may be a silica particle having a hollow structure, a porous structure, or the like.

There is no particular restriction on the shape of a silica particle 2, and examples thereof include spherical, cocoon shaped, and associated form. Among them, when a spherical particle is used as a silica particle 2, suppression of aggregation in a sol becomes easier. Although the average primary particle diameter of a silica particle 2 may be 1 to 500 nm, it may be also 5 to 300 nm, or even 20 to 100 nm. When the average primary particle diameter of a silica particle 2 is 1 nm or more, an appropriate strength can be imparted to an aerogel more easily, and an aerogel composite superior in resistance to contraction during drying can be obtained more easily. Meanwhile, when the average primary particle diameter is 500 nm or less, suppression of the solid thermal conductivity of a silica particle becomes easier, so that an aerogel composite superior in thermal insulation properties can be obtained more easily.

It is presumed that an aerogel particle 1 (aerogel component) and a silica particle 2 bond each other by means of a hydrogen bond, a chemical bond, or a combined mode of the bonds. In this case, it is believe that a hydrogen bond, a chemical bond, or a combination of the bonds is formed between a silanol group, a reactive group, or both of the two of an aerogel particle 1 (aerogel component) and a silanol group of a silica particle 2. Therefore, when the bonding mode is a chemical bond, it is believe that an appropriate strength can be imparted to an aerogel more easily. It is conceivable from the above that as a particle to be hybridized with an aerogel component, not only a silica particle but also an inorganic particle or an organic particle having a silanol group on a particle surface may be also used.

The number of silanol groups per 1 g of a silica particle 2 can be $10 \times 10^{18}$ to $1000 \times 10^{18}$/g, and may be also $50 \times 10^{18}$ to $800 \times 10^{18}$/g, or even $100 \times 10^{18}$ to $700 \times 10^{18}$/g. When the number of silanol groups per 1 g of a silica particle 2 is $10 \times 10^{18}$/g or more, the silica particle can have better reactivity with an aerogel particle 1 (aerogel component), so that an aerogel composite superior in resistance to contraction becomes available more easily. Meanwhile, when the number of silanol groups is $1000 \times 10^{18}$/g or less, rapid gelation during production of a sol may be suppressed more easily, and a homogeneous aerogel composite becomes available more easily.

An average particle diameter of a particle (an average secondary particle diameter of an aerogel particle, and an average primary particle diameter of a silica particle) of the Embodiment may be obtained by observing directly a cross-section of an aerogel composite using a scanning electron microscope (hereinafter abbreviated as "SEM"). For example, an individual particle diameter of an aerogel particle or a silica particle may be obtained from a three-dimensional network skeleton based on the diameter of a cross-section thereof. The term "diameter" referred to above means a diameter of a cross-section of a skeleton configuring a three-dimensional network skeleton, wherein the cross-section is deemed as a circle. In this regard, the diameter of a cross-section deemed as a circle means the diameter of a circle having the same area as the area of a cross-section. In determining an average particle diameter, the circle diameters of 100 particles are measured and averaged.

Figure 2:
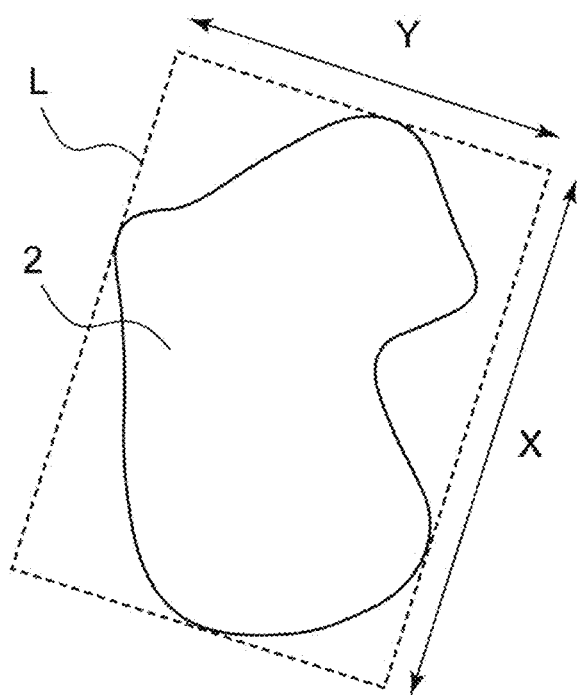
FIG. 2 is a diagram illustrating a method for calculating a biaxial average primary particle diameter of a particle.

With respect to a silica particle, an average particle diameter can be measured in a source material. For example, a biaxial average primary particle diameter may be determined from the results of observation of optional 20 particles using a SEM as follows. Namely, taking a colloidal silica particle, which is ordinarily dispersed in water at a solid concentration of 5 to 40 mass %, as an example, a wafer with a pattern wiring is cut to a 2 cm square chip, the chip is dipped in a dispersion of a colloidal silica particle for approx. 30 sec, then rinsed with pure water for approx. 30 sec and dried by a nitrogen blow. Thereafter the chip is mounted on a sample stage for SEM observation, and a silica particle is observed at a magnification of 100000× by applying an acceleration voltage of 10 kV, and an image is recorded. From the obtained image, 20 silica particles are randomly selected, and an average of the particle diameters of the particles is defined as the average particle diameter. In this case if a selected silica particle has a shape as shown in FIG. 2, a rectangle, which circumscribes the silica particle 2 and is placed to have a longest long side, (circumscribed rectangle L), is constructed. Putting the long side of the circumscribed rectangle L as X, and the short side as Y, a biaxial average primary particle diameter is calculated as (X+Y)/2, which is defined as the particle diameter of the particle.

The size of a pore 3 in an aerogel composite will be described in the section of [Density and porosity] below.

The content of an aerogel component in an aerogel composite may be 4 to 25 parts by mass with respect to the total amount of an aerogel composite as 100 parts by mass, however it may be also 10 to 20 parts by mass. When the content is 4 parts by mass or more, an appropriate strength may be imparted more easily, and when it is 25 parts by mass or less, good thermal insulation properties may be obtained more easily.

The content of a silica particle in an aerogel composite may be 1 to 25 parts by mass with respect to the total amount of an aerogel composite as 100 parts by mass, however it may be also 3 to 15 parts by mass. When the content is 1 part by mass or more, an appropriate strength may be imparted to an aerogel composite more easily, and when it is 25 parts by mass or less, the solid thermal conductivity of a silica particle can be suppressed more easily.

An aerogel composite may contain, in addition to the aerogel component and the silica particle, another component, such as carbon graphite, an aluminum compound, a magnesium compound, a silver compound, and a titanium compound, for the purpose of suppression of heat ray radiation, etc. Although there is no particular restriction on the content of such other component, it may be 1 to 5 parts by mass with respect to the total amount of an aerogel composite as 100 parts by mass from the viewpoint of securing adequately the intended effect of an aerogel composite.

[Thermal Conductivity Coefficient]

The thermal conductivity coefficient of an aerogel composite according to the Embodiment at the atmospheric pressure and 25° C. may be 0.03 W/m·K or less, or may be also 0.025 W/m·K or less, or even 0.02 W/m·K or less. When the thermal conductivity coefficient is 0.03 W/m·K or less, thermal insulation properties not less than a polyurethane foam, which is a high performance thermal insulation material, may be obtained. In this regard, there is no particular restriction on the lower limit of the thermal conductivity coefficient, and it may be, for example, 0.01 W/m·K.

A thermal conductivity coefficient may be measured by a steady-state method. Specifically, it may be measured using, for example, a steady-state method thermal conductivity coefficient measuring instrument "HFM436 Lambda" (product name, HFM436 Lambda is a registered trademark; produced by NETZSCH-GERAETEBAU GmbH). A summary of a measuring method for a thermal conductivity coefficient using a steady-state method thermal conductivity coefficient measuring instrument is as follows.

(Preparation of Measurement Sample)

An aerogel composite is processed by a knife with a knife angle of approx. 20 to 25° to a size of 150 mm×150 mm×100 mm, and used as a measurement sample. Although a recommended sample size for HFM436 Lambda is 300 mm×300 mm×100 mm, it has been confirmed that a thermal conductivity coefficient measured using the above sample size is in the same range as a thermal conductivity coefficient measured using the recommended sample size. Next, for securing the parallelism of a plane, if necessary, a measurement sample is shaped up with a sandpaper of #1500 or higher. Then a measurement sample is dried using a constant temperature drying oven "DVS402" (product name, produced by Yamato Scientific Co., Ltd.) at the atmospheric pressure and 100° C. for 30 min prior to a measurement of a thermal conductivity coefficient. Then the measurement sample is moved into a desiccator to be cooled to 25° C. Thus, a measurement sample for a thermal conductivity coefficient measurement is obtained.

(Measuring Method)

Measurement conditions are: at the atmospheric pressure, and at an average temperature of 25° C. A measurement sample obtained as above is sandwiched between upper and lower heaters with a load of 0.3 MPa, a temperature difference ΔT is set at 20° C., and an upper surface temperature, and a lower surface temperature of a measurement sample are measured, while tuning a guard heater so as to establish a one-dimensional heat flow. Then a thermal resistance $R_S$ of the measurement sample is found from the following formula.

$$R_S=N((T_U-T_L)/Q)-R_O$$

In the formula, $T_U$ represents an upper surface temperature of a measurement sample, $T_L$ represents a lower surface temperature of a measurement sample, $R_O$ represents a contact thermal resistance at upper and lower interfaces, and Q represents a heat flux meter output. N is a proportionality coefficient, which is determined in advance using a calibration sample A thermal conductivity coefficient λ of a measurement sample is calculated according to the following formula using the obtained thermal resistance $R_S$.

$$\lambda=d/R_S$$

In the formula, d represents the thickness of a measurement sample.

[Compressive Modulus]

The compressive modulus of an aerogel composite according to the Embodiment at 25° C. may be 3 MPa or less, or may be also 2 MPa or less, also 1 MPa or less, or even 0.5 MPa or less. When the compressive modulus is 3 MPa or less, an aerogel composite can be superior in handling property more easily. There is no particular restriction on the lower limit of a compressive modulus, and it may be, for example, 0.05 MPa.

[Deformation Recovery Rate]

The deformation recovery rate of an aerogel composite according to the Embodiment at 25° C. may be 90% or more, or may be also 94% or more, or even 98% or more. When the deformation recovery rate is 90% or more, superior strength, superior flexibility with respect to deformation, or the like may be obtained more easily. There is no particular restriction on the upper limit of a deformation recovery rate, and it may be, for example, 100% or 99%.

[Maximum Compressive Deformation Rate]

The maximum compressive deformation rate of an aerogel composite according to the Embodiment at 25° C. may be 80% or more, or may be also 83% or more, or even 86% or more. When the maximum compressive deformation rate is 80% or more, superior strength, superior flexibility with respect to deformation, or the like may be obtained more easily. There is no particular restriction on the upper limit of a maximum compressive deformation rate, and it may be, for example, 90%.

The compressive modulus, deformation recovery rate, and maximum compressive deformation rate may be measured using a compact table-top tester "EZ Test" (product name, produced by Shimadzu Corporation). A summary of a measuring method for a compressive modulus, etc. using a compact table-top tester is as follows.

(Preparation of Measurement Sample)

An aerogel composite is processed by a knife with a knife angle of approx. 20 to 25° to a cube (die-shaped) with a side length of 7.0 mm as a measurement sample. Next, for securing the parallelism of a plane, if necessary, a measurement sample is shaped up with a sandpaper of #1500 or higher. Then a measurement sample is dried using a constant temperature drying oven "DVS402" (product name, produced by Yamato Scientific Co., Ltd.) at the atmospheric pressure and 100° C. for 30 min prior to a measurement. Then the measurement sample is moved into a desiccator to be cooled to 25° C. Thus, a measurement sample for measuring a compressive modulus, a deformation recovery rate, and a maximum compressive deformation rate is obtained.

(Measuring Method)

A 500 N-load cell is used. Further an upper platen (φ20 mm), and a lower platen (φ118 mm) made of a stainless steel are used as compression measurement tools. A measurement sample is inserted between the tools, then compressed at a speed of 1 mm/min, and changes in a measurement sample size, etc. are measured. The measurement is terminated when a load beyond 500 N is applied, or a measurement sample is broken. A compressed strain ε can be found according to the following formula.

$$\varepsilon=\Delta d/d1$$

In the formula, Δd (mm) represents a change in the thickness of a measurement sample by a load, and d1 (mm) represents the thickness of a measurement sample before application of a load.

Meanwhile, a compressive stress σ (MPa) can be found according to the following formula.

$$\sigma=F/A$$

In the formula, F represents a compressive force (N), and A represents a cross-sectional area (mm$^2$) of a measurement sample before application of a load.

A compressive modulus E (MPa) can be found, for example, in a compressive force range of 0.1 to 0.2 N according to the following formula.

$$E=(\sigma_2-\sigma_1)/(\varepsilon_2-\varepsilon_1)$$

In the formula, $\sigma_1$ represents a compressive stress (MPa) measured with a compressive force of 0.1 N, $\sigma_2$ represents a compressive stress (MPa) measured with a compressive force of 0.2 N, $\varepsilon_1$ represents a compressed strain measured at a compressive stress $\sigma_1$, and $\varepsilon_2$ represents a compressed strain measured at a compressive stress $\sigma_2$.

Meanwhile, a deformation recovery rate and a maximum compressive deformation rate can be calculated according to the following formula, wherein the thickness of a measurement sample before application of a load is expressed as d1, the thickness of a measurement sample at a time point when the maximum load of 500 N is applied, or a measurement sample is broken is expressed as d2, and the thickness of a measurement sample after removal of a load is expressed as d3.

$$\text{Deformation recovery rate}=(d3-d2)/(d1-d2)\times100$$

$$\text{Maximum compressive deformation rate}=(d1-d2)/d1\times100$$

The thermal conductivity coefficient, compressive modulus, deformation recovery rate, and maximum compressive deformation rate may be adjusted appropriately by changing production conditions, source materials, etc. of an aerogel composite described below.

[Density and Porosity]

The size of a pore 3, namely an average pore diameter of an aerogel composite according to the Embodiment may be 5 to 1000 nm, or may be also 25 to 500 nm. When the average pore diameter is 5 nm or more, an aerogel composite superior in flexibility may be obtained more easily, and when it is 1000 nm or less, an aerogel composite superior in thermal insulation properties may be obtained more easily.

The density of an aerogel composite according to the Embodiment at 25° C. may be 0.05 to 0.25 g/cm$^3$, or may be also 0.1 to 0.2 g/cm$^3$. When the density is 0.05 g/cm$^3$ or more, improved strength and flexibility may be obtained, and when it is 0.25 g/cm³ or less, improved thermal insulation properties may be obtained.

The porosity of an aerogel composite according to the Embodiment at 25° C. may be 85 to 95%, or may be also 87 to 93%. When the porosity is 85% or more, improved thermal insulation properties may be obtained, and when it is 95% or less, improved strength and flexibility may be obtained.

The average pore diameter of a pore (open pore) continuing in a 3-dimensional network, the density, and the porosity of an aerogel composite may be measured by mercury intrusion porosimetry according to DIN 66133. As a measuring instrument, for example, AUTOPORE IV 9520 (product name, produced by Shimadzu Corporation) may be used.

<Specific Mode of Aerogel Component>

Examples of an aerogel component of an aerogel composite according to the Embodiment include the following modes. When any of the modes is used, the thermal insulation properties and flexibility of an aerogel composite may be regulated to a desired level easily. However, each of the modes is used not necessarily for the purpose of obtaining an aerogel composite provided for by the Embodiment. When each of the modes is used, an aerogel composite having a thermal conductivity coefficient and a compressive modulus corresponding to each mode may be obtained. Therefore, an aerogel composite having thermal insulation properties and flexibility suitable for a use can be provided.

(First Mode)

An aerogel composite according to the Embodiment may have a structure expressed by the following general formula (1).

[Chemical Formula 1]

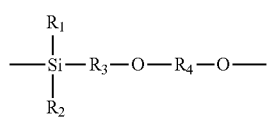

(1)

In Formula (1), $R_1$ and $R_2$ each independently represent an alkyl group, or an aryl group, $R_3$ and $R_4$ each independently represent an alkylene group. Examples of an aryl group include a phenyl group, and a substituted phenyl group. Examples of a substituent of a substituted phenyl group include an alkyl group, a vinyl group, a mercapto group, an amino group, a nitro group, or a cyano group.

When the structure is introduced as an aerogel component into the skeleton of an aerogel composite, an aerogel composite, which has a low thermal conductivity coefficient, and is flexible, may be obtained. From this viewpoint, in Formula (1), $R_1$ and $R_2$ may each independently be for example a C1 to C6 alkyl group, or a phenyl group, and examples of the alkyl group include a methyl group. Further, in Formula (1), $R_3$ and $R_4$ may each independently be for example a C1 to C6 alkylene group, and examples of the alkylene group include an ethylene group, and a propylene group.

(Second Mode)

An aerogel composite according to the Embodiment is an aerogel composite having a ladder structure comprising struts and bridges, and may be an aerogel composite in which a bridge has a structure expressed by the following general Formula (2). When the ladder structure is introduced as an aerogel component into the skeleton of an aerogel composite, the heat resistance and mechanical strength may be improved. In this regard, a "ladder structure" in the Embodiment is one having 2 struts and bridges connecting the struts together (one with a so-called "ladder" shape). In the present mode, the skeleton of an aerogel composite may be configured with a ladder structure, or an aerogel composite may have a ladder structure only partly.

[Chemical Formula 2]

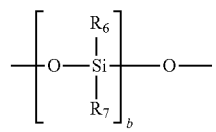

(2)

In Formula (2), $R_6$ and $R_7$ each independently represent an alkyl group, or an aryl group, and b represents an integer of 1 to 50. Examples of the aryl group include a phenyl group, and a substituted phenyl group. Examples of a substituent of a substituted phenyl group include an alkyl group, a vinyl group, a mercapto group, an amino group, a nitro group, and a cyano group. Further, in Formula (2), in a case where b is an integer of 2 or higher, 2 or more $R_6$ may be respectively the same or different, and similarly 2 or more $R_7$ may be respectively the same or different.

When the structure is introduced as an aerogel component into the skeleton of an aerogel composite, an aerogel composite having flexibility superior to, for example, an aerogel having a structure originated from a conventional ladder-form silsesquioxane (namely that having a structure expressed by the following general Formula (X)) is obtained. In this regard, the structure of a bridge in an aerogel having a structure originated from a conventional ladder-form silsesquioxane is —O— as shown in the following general Formula (X), however in an aerogel composite according to the Embodiment the structure of a bridge is a structure expressed by the general Formula (2) (polysiloxane structure).

[Chemical Formula 3]

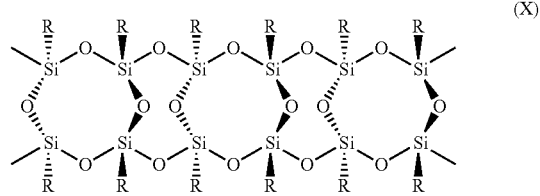

(X)

In Formula (X), R represents a hydroxy group, an alkyl group, or an aryl group.

Although there is no particular restriction on the structure to become a strut and the chain length thereof as well as the interval between the structures to become bridges, a ladder structure may have a structure expressed by the following general Formula (3) from the viewpoint of improvement of heat resistance and mechanical strength.

[Chemical Formula 4]

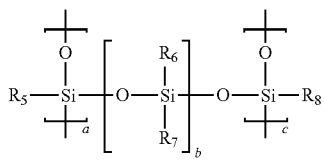

(3)

In Formula (3), $R_5$, $R_6$, $R_7$ and $R_8$ each independently represent an alkyl group or an aryl group, a and c each independently represent an integer of 1 to 3000, and b represents an integer of 1 to 50. In this case, examples of an aryl group include a phenyl group, and a substituted phenyl group. Examples of a substituent of a substituted phenyl group include an alkyl group, a vinyl group, a mercapto group, an amino group, a nitro group, and a cyano group. Further, in Formula (3), in a case where b is an integer of 2 or higher, 2 or more $R_6$ may be respectively the same or different, and similarly 2 or more $R_7$ may be respectively the same or different. Further, in Formula (3), in a case where a is an integer of 2 or higher, 2 or more $R_5$ may be respectively the same or different, and similarly in a case where c is an integer of 2 or higher, 2 or more $R_8$ may be respectively the same or different.

In Formulas (2) and (3), $R_5$, $R_6$, $R_7$ and $R_8$ (provided that $R_5$ and $R_8$ are limited to Formula (3)) each independently are, for example, a C1 to C6 alkyl group, or a phenyl group from the viewpoint of achieving superior flexibility, and examples of the alkyl group include a methyl group. Further, in Formula (3), a and c may be each independently 6 to 2000, or may be also 10 to 1000. In Formulas (2) and (3), b may be 2 to 30, or may be also 5 to 20.

(Third Mode)

An aerogel composite according to the Embodiment may be one obtained by drying a wet gel generated from a sol comprising a silica particle, and at least one selected from the group consisting of a silicon compound having a hydrolyzable functional group in the molecule, and a hydrolysis product of the silicon compound (hereinafter the silicon compounds, etc. may be occasionally called collectively as "silicon compounds"). The aerogel composite having been described above may be also obtained by drying a wet gel generated from a sol containing a silica particle, and any of the silicon compounds.

The silicon number in the molecule of a silicon compound may be 1 or 2. There is no particular restriction on a silicon compound having a hydrolyzable functional group in the molecule, and examples thereof include an alkyl silicon alkoxide. An alkyl silicon alkoxide may limit the number of hydrolyzable functional groups to 3 or less from the viewpoint of improvement of water resistance, and specific examples include methyltrimethoxysilane, dimethyldimethoxysilane, and ethyltrimethoxysilane. In this regard, examples of a hydrolyzable functional group include an alkoxy group, such as a methoxy group, and an ethoxy group.

Further, vinyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane, etc., which are silicon compounds having 3 or less hydrolyzable functional groups as well as a reactive group in the molecule, may be also used.

Further, bis(trimethoxysilyl)methane, bis(trimethoxysilyl)ethane, bis(trimethoxysilyl)hexane, etc., which are silicon compounds having 3 or less hydrolyzable functional groups at a molecular terminal, may be also used.

The silicon compounds may be used singly, or in a combination of 2 or more thereof.

In producing an aerogel composite according to the Embodiment, a sol containing the silicon compounds may further contain at least one selected from the group consisting of a polysiloxane compound having a reactive group in the molecule, and a hydrolysis product of the polysiloxane compound (hereinafter the polysiloxane compounds, etc. may be occasionally called collectively as "polysiloxane compounds").

Although there is no particular restriction on a reactive group in the polysiloxane compounds, it may be a group, which is reactive with the same reactive group or with another reactive group, and examples thereof include an alkoxy group, a silanol group, a hydroxyalkyl group, an epoxy group, a polyether group, a mercapto group, a carboxyl group, and a phenol group. Polysiloxane compounds having any of the reactive groups may be used singly, or in a combination of 2 or more thereof. Examples of the reactive group include, from the viewpoint of improving the flexibility of an aerogel composite, an alkoxy group, a silanol group, a hydroxyalkyl group, and a polyether group. Among them, an alkoxy group, or a hydroxyalkyl group can improve further the compatibility of a sol. From the viewpoint of enhancement of the reactivity of a polysiloxane compound and reduction of the thermal conductivity coefficient of an aerogel composite, the carbon number of an alkoxy group and a hydroxyalkyl group may be 1 to 6, however from the viewpoint of improving further the flexibility of an aerogel composite it may be also 2 to 4.

Examples of a polysiloxane compound having a hydroxyalkyl group in the molecule include those having a structure expressed by the following general Formula (4). A structure expressed by the above Formula (1) may be introduced in the skeleton of an aerogel composite by using a polysiloxane compound having a structure expressed by the following general Formula (4).

[Chemical Formula 5]

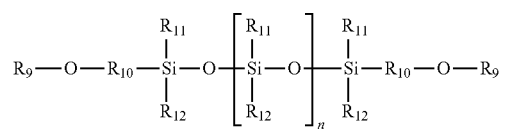

(4)

In Formula (4), $R_9$ represents a hydroxyalkyl group, $R_{10}$ represents an alkylene group, $R_{11}$ and $R_{12}$ each independently represent an alkyl group, or an aryl group, and n represents an integer of 1 to 50. In this case, examples of an aryl group include a phenyl group, and a substituted phenyl group. Examples of a substituent of the substituted phenyl group include an alkyl group, a vinyl group, a mercapto group, an amino group, a nitro group, and a cyano group. Further, in Formula (4), 2 $R_9$ may be respectively the same or different, and similarly 2 $R_{10}$ may be respectively the same or different. Further, in Formula (4), 2 or more $R_{11}$ may be respectively the same or different, and similarly 2 or more $R_{12}$ may be respectively the same or different.

When a wet gel generated from a sol containing any of polysiloxane compounds having the above structure is used, an aerogel composite which has a low thermal conductivity coefficient and is flexible can be obtained further easily. From such a viewpoint, in Formula (4), $R_9$ may be for example a C1 to C6 hydroxyalkyl group, and examples of the hydroxyalkyl group include a hydroxyethyl group, and a hydroxypropyl group. Further, in Formula (4), $R_{10}$ may be for example a C1 to C6 alkylene group, and examples of the alkylene group include an ethylene group, and a propylene group. Further, in Formula (4), $R_{11}$ and $R_{12}$ may be each independently for example a C1 to C6 alkyl group, or a phenyl group, and examples of the alkyl group include a methyl group. Meanwhile, in Formula (4), n may be 2 to 30, or may be also 5 to 20.

For a polysiloxane compound having a structure expressed by Formula (4), a commercial product may be used, and examples thereof include compounds, such as X-22-160AS, KF-6001, KF-6002, and KF-6003 (all produced by Shin-Etsu Chemical Co., Ltd.), and compounds, such as XF42-B0970, and Fluid OFOH 702-4% (all produced by Momentive Performance Materials Inc.).

Examples of a polysiloxane compound having an alkoxy group in the molecule include those having a structure expressed by the following general Formula (5). A ladder structure having a bridge expressed by the above Formula (2) may be introduced in the skeleton of an aerogel composite by using a polysiloxane compound having a structure expressed by the following general Formula (5).

[Chemical Formula 6]

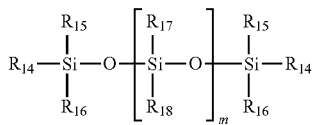

(5)

In Formula (5), $R_{14}$ represents an alkyl group, or an alkoxy group, $R_{15}$ and $R_{16}$ each independently represent an alkoxy group, $R_{17}$ and $R_{18}$ each independently represent an alkyl group, or an aryl group, and m represents an integer of 1 to 50. In this case, examples of an aryl group include a phenyl group, and a substituted phenyl group. Examples of a substituent of a substituted phenyl group include an alkyl group, a vinyl group, a mercapto group, an amino group, a nitro group, and a cyano group. Meanwhile, in Formula (5), 2 $R_{14}$ may be respectively the same or different, 2 $R_{15}$ may be respectively the same or different, and similarly 2 $R_{16}$ may be respectively the same or different. Further, in Formula (5), in a case where m is an integer of 2 or higher, 2 or more $R_{17}$ may be respectively the same or different, and similarly 2 or more $R_{18}$ may be respectively the same or different.

When a wet gel generated from a sol containing any of polysiloxane compounds having the above structure is used, an aerogel composite which has a low thermal conductivity coefficient and is flexible can be obtained further easily. From such a viewpoint, in Formula (5), $R_{14}$ may be for example a C1 to C6 alkyl group, or a C1 to C6 alkoxy group, and examples of the alkyl group and alkoxy group include a methyl group, a methoxy group, and an ethoxy group. Further, in Formula (5), $R_{15}$ and $R_{16}$ may be each independently for example a C1 to C6 alkoxy group, and examples of the alkoxy group include a methoxy group, and an ethoxy group. Further, in Formula (5), $R_{17}$ and $R_{18}$ may be each independently for example a C1 to C6 alkyl group, or a phenyl group, and examples of the alkyl group include a methyl group. Meanwhile, in Formula (5), m may be 2 to 30, or may be also 5 to 20.

A polysiloxane compound having a structure expressed by Formula (5) may be obtained for example referring appropriately to production methods reported in Japanese Unexamined Patent Publication No. 2000-26609, Japanese Unexamined Patent Publication No. 2012-233110, etc.

Since an alkoxy group is hydrolyzable, it is possible that a polysiloxane compound having an alkoxy group in the molecule exists in a sol as a hydrolysis product, therefore a polysiloxane compound having an alkoxy group in the molecule and a hydrolysis product thereof may coexist. Further, in a polysiloxane compound having an alkoxy group in the molecule, all of the alkoxy groups in the molecule may be hydrolyzed, or only part of them may be hydrolyzed.

The polysiloxane compounds may be used singly, or in a combination of 2 or more thereof.

The content of any of the silicon compounds contained in a sol with respect to the total amount of the sol as 100 parts by mass may be 5 to 50 parts by mass, or may be also 10 to 30 parts by mass. When the content is 5 parts by mass or more, improved reactivity may be obtained more easily, and when it is 50 parts by mass or less, improved compatibility may be obtained more easily.

When the sol contains further any of the polysiloxane compounds, the total sum of the contents of silicon compounds and polysiloxane compounds with respect to the total amount of the sol as 100 parts by mass may be 5 to 50 parts by mass, or may be also 10 to 30 parts by mass. When the total sum of the contents is 5 parts by mass or more, improved reactivity may be obtained more easily, and when it is 50 parts by mass or less, improved compatibility may be obtained more easily. In this case, the ratio of the content of silicon compounds to the content of a hydrolysis product of polysiloxane compounds may be 0.5:1 to 4:1, or may be also 1:1 to 2:1. When the ratio of the contents of the compounds is 0.5:1 or higher, excellent compatibility may be obtained more easily, and when it is 4:1 or less, contraction of a gel may be suppressed more easily.

The content of a silica particle contained in the sol with respect to the total amount of the sol as 100 parts by mass may be 1 to 20 parts by mass, or may be also 4 to 15 parts by mass. When the content is 1 part by mass or more, an appropriate strength may be imparted to an aerogel more easily, and an aerogel composite superior in resistance to contraction during drying may be obtained more easily. When the content is 20 parts by mass or less, the solid thermal conductivity of a silica particle may be suppressed more easily, and an aerogel composite superior in thermal insulation properties may be obtained more easily.

(Other Mode)

An aerogel composite according to the Embodiment may have a structure expressed by the following general Formula (6).

[Chemical Formula 7]

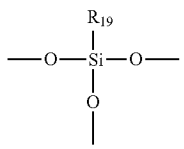

(6)

In Formula (6), $R_{19}$ represents an alkyl group. Examples of the alkyl group include a C1 to C6 alkyl group, and examples of the alkyl group include a methyl group.

An aerogel composite according to the Embodiment may have a structure expressed by the following general Formula (7).

[Chemical Formula 8]

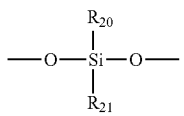

(7)

In Formula (7), $R_{20}$ and $R_{21}$ each independently represent an alkyl group. Examples of the alkyl group include a C1 to C6 alkyl group, and examples of the alkyl group include a methyl group.

An aerogel composite according to the Embodiment may have a structure expressed by the following general Formula (8).

[Chemical Formula 9]

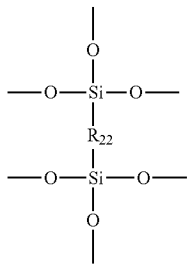

(8)

In Formula (8), $R_{22}$ represents an alkylene group. Examples of the alkylene group include a C1 to C10 alkylene group, and examples of the alkylene group include an ethylene group, and a hexylene group.

<Method for Producing Aerogel Composite>

Next, a method for producing an aerogel composite will be described. There is no particular restriction on a method for producing an aerogel composite, and it may be produced for example by the following method.

Namely, an aerogel composite according to the Embodiment may be produced by a production method comprising mainly a step of preparing a sol; a step of preparing a wet gel by gelating the sol prepared in the step of preparing a sol, and then aging the same to obtain a wet gel; a step of washing the wet gel obtained in the step of preparing a wet gel, and (if necessary) conducting solvent exchange; and a step of drying for drying the wet gel subjected to washing and solvent exchange. In this regard, a sol means a state before occurrence of a gelation reaction, and it means in the Embodiment a state in which any of the silicon compounds, optionally any of the polysiloxane compounds, and a silica particle are dissolved or dispersed in a solvent. Further, a wet gel means a solid gel which contains a liquid medium, however is in a wet state without fluidity.

Each step in a method for producing an aerogel composite according to the Embodiment will be described below.

(Step of Preparing Sol)

A step of preparing a sol is a step of preparing a sol by mixing the polysiloxane compound, or the silicon compound, optionally a silica particle, and a solvent followed by hydrolysis. In this regard, a silica particle may be admixed in a state dispersed in a solvent as a dispersion liquid. In this step, an acid catalyst may be further added in a solvent for promoting the hydrolysis reaction. Further, a surfactant, a thermally hydrolyzable compound, etc. may be also added in a solvent as disclosed in Japanese Patent No. 5250900. Moreover, a component, such as carbon graphite, an aluminum compound, a magnesium compound, a silver compound, and a titanium compound, may be added into a solvent for the purpose of suppression of heat ray radiation, etc.

As a solvent, for example, water, or a mixture liquid of water and an alcohol may be used. Examples of an alcohol include methanol, ethanol, n-propanol, 2-propanol, n-butanol, 2-butanol, and t-butanol. Among them, from the standpoint of reducing a interfacial tension with respect to a gel wall, examples of an alcohol having a low surface tension and a low boiling point include methanol, ethanol, and 2-propanol. The alcohols may be used singly, or in a combination of 2 or more thereof.

For example, an alcohol is used as a solvent, the amount of an alcohol may be 4 to 8 mol per 1 mol of the total amount of a silicon compound and a polysiloxane compound, or may be also 4 to 6.5 mol, or even 4.5 to 6 mol. When the amount of an alcohol is 4 mol or more, excellent compatibility may be obtained more easily, and when it is 8 mol or less, contraction of a gel may be suppressed more easily.

Examples of an acid catalyst include an inorganic acid, such as hydrofluoric acid, hydrochloric acid, nitric acid, sulfuric acid, sulfurous acid, phosphoric acid, phosphorous acid, hypophosphorous acid, bromic acid, chloric acid, chlorous acid, and hypochlorous acid; an acidic phosphate, such as acidic aluminum phosphate, acidic magnesium phosphate, and acidic zinc phosphate; and an organic carboxylic acid, such as acetic acid, formic acid, propionic acid, oxalic acid, malonic acid, succinic acid, citric acid, malic acid, adipic acid, and azelaic acid. Among them, as an acid catalyst for improving the water resistance of an obtained aerogel composite, an organic carboxylic acid may be included as an example. Examples of the organic carboxylic acid include acetic acid, and also formic acid, propionic acid, oxalic acid, and malonic acid. They may be used singly, or in a combination of 2 or more thereof.

When an acid catalyst is used, a hydrolysis reaction of a silicon compound and a polysiloxane compound is promoted, and a sol may be obtained in a shorter time.

The addition amount of an acid catalyst with respect to the total amount of a silicon compound and a polysiloxane compound as 100 parts by mass may be 0.001 to 0.1 part by mass.

As a surfactant a nonionic surfactant, an ionic surfactant, etc. may be used. The surfactants may be used singly, or in a combination of 2 or more thereof.

As a nonionic surfactant, for example, one comprising a hydrophilic moiety such as polyoxyethylene and a hydrophobic moiety composed mainly of an alkyl group, or one comprising a hydrophilic moiety such as polyoxypropylene may be used. Examples of one comprising a hydrophilic moiety such as polyoxyethylene and a hydrophobic moiety composed mainly of an alkyl group include polyoxyethylene nonylphenyl ether, polyoxyethylene octylphenyl ether, and polyoxyethylene alkyl ether. Examples of one comprising a hydrophilic moiety such as polyoxypropylene include polyoxypropylene alkyl ether, and a block copolymer of polyoxyethylene and polyoxypropylene.

Examples of an ionic surfactant include a cationic surfactant, an anionic surfactant, and an amphoteric surfactant. Examples of a cationic surfactant include cetyltrimethylammonium bromide, and cetyltrimethylammonium chloride; and examples of an anionic surfactant include sodium dodecyl sulfonate. Examples of an amphoteric surfactant include an amino acid surfactant, a betaine surfactant, and an amine oxide surfactant. Examples of an amino acid surfactant include acylglutamic acid. Examples of a betaine surfactant include lauryldimethylaminoacetic acid betaine, and stearyldimethylaminoacetic acid betaine. Examples of an amine oxide surfactant include lauryldimethylamine oxide.

It is conceived that such a surfactant acts to suppress phase separation by reducing a difference in a chemical affinity between a solvent in a reaction system and a growing siloxane polymer in a step of preparing a wet gel described below.

Although the addition amount of a surfactant depends on the type of a surfactant, and the type and amount of a silicon compound and a polysiloxane compound, it may be for example 1 to 100 parts by mass with respect to the total amount of a silicon compound and a polysiloxane compound as 100 parts by mass. The addition amount may be also 5 to 60 parts by mass.

It is conceived that a thermally hydrolyzable compound generates a base catalyst by thermal hydrolysis to make a reaction solution basic, thereby promoting a sol-gel reaction in a step of preparing a wet gel described below. Therefore, there is no particular restriction on the thermally hydrolyzable compound, insofar as it is a compound able to make a reaction solution basic after hydrolysis, and examples thereof include urea; an acid amide, such as formamide, N-methylformamide, N,N-dimethylformamide, acetamide, N-methylacetamide, and N,N-dimethylacetamide; and a cyclic nitrogen compound, such as hexamethylenetetramine Among them, especially urea is apt to achieve the above promotion effect.

There is no particular restriction on the addition amount of a thermally hydrolyzable compound, insofar as it is an amount sufficient to promote thoroughly a sol-gel reaction in a step of preparing a wet gel described below. For example, when urea is used as a thermally hydrolyzable compound, its addition amount may be 1 to 200 parts by mass with respect to the total amount of a silicon compound and a polysiloxane compound as 100 parts by mass. This addition amount may be also 2 to 150 parts by mass. When the addition amount is 1 part by mass or more, excellent reactivity may be obtained more easily, and when the same is 200 parts by mass or less, precipitation of a crystal and decrease in a gel density may be suppressed more easily.

Hydrolysis in a step of preparing a sol may be carried out, for example, in a temperature environment of 20 to 60° C. for 10 min to 24 hours, or may be carried out in a temperature environment of 50 to 60° C. for 5 min to 8 hours, subject to the type and quantity of a silicon compound, a polysiloxane compound, a silica particle, an acid catalyst, a surfactant, or the like in a mixture liquid. By this means, hydrolyzable functional groups in a silicon compound or a polysiloxane compound are hydrolyzed adequately, so that a hydrolysis product of a silicon compound or a hydrolysis product of a polysiloxane compound can be obtained more surely.

However, in a case where a thermally hydrolyzable compound is added into a solvent, the temperature environment of a step of preparing a sol may be adjusted to a temperature at which hydrolysis of the thermally hydrolyzable compound is suppressed and gelation of a sol is suppressed. Such a temperature is optional insofar as hydrolysis of a thermally hydrolyzable compound is suppressed at the temperature. For example, in a case where urea is used as a thermally hydrolyzable compound, the temperature environment of a step of preparing a sol may be 0 to 40° C., or also 10 to 30° C.

(Step of Preparing Wet Gel)

A step of preparing a wet gel is a step of obtaining a wet gel by gelating a sol obtained in the step of preparing a sol and aging the same. In the present step a base catalyst may be used for promoting gelation.

Examples of a base catalyst include an alkali metal hydroxide, such as lithium hydroxide, sodium hydroxide, potassium hydroxide, and cesium hydroxide; an ammonium compound, such as ammonium hydroxide, ammonium fluoride, ammonium chloride, and ammonium bromide; a basic sodium phosphate salt, such as sodium metaphosphate, sodium pyrophosphate, and sodium polyphosphate; an aliphatic amine, such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine, and triethanolamine; and a nitrogen-containing heterocyclic compound, such as morpholine, N-methylmorpholine, 2-methylmorpholine, piperazine and its derivative, piperidine and its derivative, and imidazole and its derivative. Among them, ammonium hydroxide (ammonia water) is superior, because it has high volatility so that it hardly remains in an aerogel composite after drying to impair the water resistance, and further because it is economical. The base catalyst may be used singly, or in a combination of 2 or more thereof.

By using a base catalyst a dehydration condensation reaction, a dealcoholization condensation reaction, or both the reactions, of any of silicon compounds and polysiloxane compounds, and a silica particle in a sol may be promoted such that gelation of the sol is performed in a shorter time. Further, by this means, a wet gel with a higher strength (stiffness) may be obtained. Especially ammonia is highly volatile and hardly remains in an aerogel composite, therefore when ammonia is used as a base catalyst, an aerogel composite with improved water resistance may be obtained.

The addition amount of a base catalyst may be 0.5 to 5 parts by mass, or may be also 1 to 4 parts by mass with respect to the total amount of silicon compounds and polysiloxane compounds as 100 parts by mass. When the addition amount is 0.5 part by mass or more, gelation can be carried out in a shorter time, and when it is 5 parts by mass or less, decrease in water resistance may be further suppressed.

Gelation of a sol in a step of preparing a wet gel may be conducted in a tightly closed container such that a solvent and a base catalyst do not volatilize. The gelation temperature may be 30 to 90° C., or may be also 40 to 80° C. When the gelation temperature is 30° C. or higher, gelation may be carried out in a shorter time, so that a wet gel with a higher strength (stiffness) may be obtained. When the gelation temperature is 90° C. or less, volatilization of a solvent (especially an alcohol) may be suppressed more easily, and therefore gelation may be carried out while suppressing volume contraction.

Aging in a step of preparing a wet gel may be conducted in a tightly closed container such that a solvent and a base catalyst do not volatilize. By aging, binding among components constituting a wet gel becomes stronger, and as a result, a wet gel with a strength (stiffness) high enough to suppress contraction during drying may be obtained. Although the aging temperature may be 30 to 90° C., it may be also 40 to 80° C. When the aging temperature is 30° C. or higher, a wet gel with a higher strength (stiffness) may be obtained, and when the aging temperature is 90° C. or less, volatilization of a solvent (especially an alcohol) may be suppressed more easily, so that gelation can be carried out while suppressing volume contraction.

Since it is often difficult to detect the end point of gelation of a sol, gelation of a sol and succeeding aging may be carried out continuously in a series of operations.

Although the gelation time and the aging time depend on a gelation temperature and an aging temperature, since a silica particle is contained in a sol according to the Embodiment, especially the gelation time may be shortened compared to a conventional method for producing an aerogel. The reason behind the above is presumed that a silanol group, a reactive group, or both, which silicon compounds or polysiloxane compounds in a sol have, form a hydrogen bond, a chemical bond, or a combination of both the bonds with a silanol group of a silica particle. The gelation time may be 10 to 120 min, or may be also 20 to 90 min. When the gelation time is 10 min or more, a homogeneous wet gel may be obtained more easily, and when the same is 120 min or less, a step of washing and solvent exchange through a step of drying described below can be simplified. Through the entire process step of gelation and aging, the total of gelation time and aging time may be 4 to 480 hours, or may be also 6 to 120 hours. When the total of gelation time and aging time is 4 hours or more, a wet gel with a higher strength (stiffness) may be obtained, and when the same is 480 hours or less the aging effect may be maintained more easily.

In order to reduce the density of an aerogel composite obtained, or to increase the average pore diameter of the same, the gelation temperature and the aging temperature may be raised within the above ranges, or the total time of the gelation time and the aging time may be increased within the above range. Further, in order to increase the density of an aerogel composite obtained or to decrease the average pore diameter of the same, the gelation temperature and the aging temperature may be lowered within the above ranges, or the total time of the gelation time and the aging time may be reduced within the above range.

(Step of Washing and Solvent Exchange)

A step of washing and solvent exchange is a step including a step (washing step) for washing a wet gel obtained in the step of preparing a wet gel, and a step (solvent exchange step) for exchanging a washing liquid in a wet gel for a solvent suitable for drying conditions (a step of drying described below). Although a step of washing and solvent exchange may be conducted in a mode in which only a solvent exchange step is implemented but not a step of washing a wet gel, a wet gel may be washed from the viewpoint of enabling production of a higher purity aerogel composite by reducing impurities, such as unreacted substances or byproducts in a wet gel. In this regard, since a silica particle is contained in a gel according to the Embodiment, a solvent exchange step is not necessarily essential as described below.

In a washing step a wet gel obtained in the step of preparing a wet gel is washed. The washing may be performed using, for example, water or an organic solvent repeatedly. In this case, the washing efficiency may be improved by raising the temperature.

As an organic solvent, various organic solvents, such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethyl sulfoxide, acetic acid, and formic acid, may be used. The organic solvents may be used singly, or in a combination of 2 or more thereof.

In a solvent exchange step described below, a low surface tension solvent may be used for suppressing contraction of a gel by drying. However, a low surface tension solvent has in general extremely low mutual solubility with water. Therefore, when a low surface tension solvent is used in a solvent exchange step, as an organic solvent used in a washing step, a hydrophilic organic solvent exhibiting high mutual solubility with respect to both water and the low surface tension solvent may be presented as an example. In this regard, a hydrophilic organic solvent used in a washing step can perform a function of preliminary exchange for a solvent exchange step. Examples of a hydrophilic organic solvent among the above organic solvents include methanol, ethanol, 2-propanol, acetone, and methyl ethyl ketone. In this regard, methanol, ethanol, methyl ethyl ketone, etc. are superior in terms of economic efficiency.

The amount of water or an organic solvent used in a washing step may be an amount enough to exchange a solvent in a wet gel, and to wash. Such an amount may be 3 to 10 times as much as the volume of a wet gel. Washing may be repeated until the water content in a wet gel after washing reaches 10 mass % or less with respect to the mass of silica.

The temperature environment in a washing step may be not higher than the boiling point of a solvent used for washing, and for example in a case where methanol is used, it may be raised to between approx. 30 and 60° C.

In a solvent exchange step, a solvent of a washed wet gel is exchanged with a predetermined exchange solvent for the sake of suppression of contraction in a step of drying described below. In this case, the exchange efficiency may be enhanced by raising the temperature. Specific examples of an exchange solvent, in a case where drying is performed in a step of drying at the atmospheric pressure and at a temperature less than a critical point of a solvent used for drying, include a low surface tension solvent described below. Meanwhile, in a case where supercritical drying is performed, examples of an exchange solvent include ethanol, methanol, 2-propanol, dichlorodifluoromethane, carbon dioxide, and a mixture solvent of 2 or more thereof.

Examples of a low surface tension solvent include those having a surface tension of 30 mN/m or less at 20° C. The surface tension may be also 25 mN/m or less, or even 20 mN/m or less. Examples of a low surface tension solvent include an aliphatic hydrocarbon, such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); an aromatic hydrocarbon, such as benzene (28.9), toluene (28.5), m-xylene (28.7), and p-xylene (28.3); a halogenated hydrocarbon, such as dichloromethane (27.9), chloroform (27.2), carbon tetrachloride (26.9), 1-chloropropane (21.8), and 2-chloropropane (18.1); an ether, such as ethyl ether (17.1), propyl ether (20.5), isopropyl ether (17.7), butyl ethyl ether (20.8), and 1,2-dimethoxyethane (24.6); a ketone, such as acetone (23.3), methyl ethyl ketone (24.6), methyl propyl ketone (25.1), and diethyl ketone (25.3); and an ester, such as methyl acetate (24.8), ethyl acetate (23.8), propyl acetate (24.3), isopropyl acetate (21.2), isobutyl acetate (23.7), and ethyl butyrate (24.6), (wherein, a number in parentheses means a surface tension at 20° C. in unit [mN/m]). Among them, an aliphatic hydrocarbon (such as hexane and heptane) has a low surface tension, and is superior in work environmental property. Further, when a hydrophilic organic solvent, such as acetone, methyl ethyl ketone, and 1,2-dimethoxyethane, among the above solvents is used, it may have also a function of an organic solvent for the washing step. Further, among the above solvents, those with a boiling point at a normal pressure of 100° C. or less may be also used, because drying in a step of drying described below is easy. The solvents may be used singly, or in a combination of 2 or more thereof.

The amount of a solvent used in a solvent exchange step may be an amount sufficient for exchanging a solvent in a wet gel after drying. Such an amount may be 3 to 10 times as much as the volume of a wet gel.

The temperature environment in a solvent exchange step may be not higher than the boiling point of a solvent used for exchange, and for example in a case where heptane is used, it may be raised to between approx. 30 and 60° C.

Since a silica particle is contained in a gel according to the Embodiment, a solvent exchange step is not necessarily essential, as described above. A mechanism is conjectured as follows. Namely, although conventionally a solvent of a wet gel is exchanged with a predetermined exchange solvent (low surface tension solvent) in order to suppress contraction in a step of drying, according to the Embodiment a silica particle functions as a support for a three-dimensional network skeleton, and as a result, the skeleton is supported such that contraction of a gel in a step of drying is suppressed. Consequently, it is conceivable that a gel can be subjected to a step of drying as it is without exchanging a solvent used for washing. As described above, a step of washing and solvent exchange through a step of drying may be simplified according to the Embodiment, provided that the Embodiment does not exclude in any way implementation of a solvent exchange step.

(Step of Drying)

In a step of drying, a wet gel subjected to washing and (according to need) solvent exchange as described above is dried. After the above, an aerogel composite is obtained finally.

There is no particular restriction on a drying technique, and publicly known normal pressure drying, supercritical drying, or freeze-drying may be applied. From the viewpoint that a low density aerogel composite may be produced easily, normal pressure drying, or supercritical drying among the above may be applied. Also, from the viewpoint that production at a low cost is possible, normal pressure drying may be applied. "Normal pressure" in the Embodiment means 0.1 MPa (atmospheric pressure).

An aerogel composite according to the Embodiment can be obtained by drying a wet gel subjected to washing, and (according to need) solvent exchange at a temperature lower than the critical point of a solvent used for drying and at the atmospheric pressure. Although a drying temperature may vary depending on the type of an exchanged solvent (if a solvent exchange is not conducted, a solvent used for washing), it may be 20 to 150° C. considering that especially drying at a high temperature may accelerate the evaporation speed of a solvent and cause occasionally a large crack in a gel. However, the drying temperature may be also 60 to 120° C. The drying time may be 4 to 120 hours subject to the volume of a wet gel or a drying temperature. In this regard, normal pressure drying includes according to the Embodiment also a case where a pressure less than a critical point is applied for the sake of expediting drying within a range not jeopardizing the productivity An aerogel composite according to the Embodiment may be obtained also by conducting supercritical drying on a wet gel subjected to washing, and (according to need) solvent exchange. Supercritical drying may be conducted by a publicly known technique. Examples of a method for supercritical drying include a method by which a solvent is removed at a temperature and a pressure not lower than the critical point of a solvent contained in a wet gel. Alternatively, examples of a method for supercritical drying include a method by which a wet gel is immersed in liquefied carbon dioxide for example under conditions of approx. 20 to 25° C., and 5 to 20 MPa to exchange all or part of the solvent contained in a wet gel for carbon dioxide having a lower critical point than that of the solvent, and then carbon dioxide alone, or a mixture of carbon dioxide and the solvent is removed.

An aerogel composite obtained by such normal pressure drying, or supercritical drying may be additionally dried at normal pressure, at 105 to 200° C. for 0.5 to 2 hours. By this means, an aerogel composite having a low density and small pores may be obtained more easily. Additional drying may be also conducted at normal pressure, at 150 to 200° C.

<Supporting Member with Aerogel Composite>

A supporting member with an aerogel composite according to the Embodiment is constituted with an aerogel composite described hereinabove, and a supporting member to carry the aerogel composite. Such a supporting member with an aerogel composite may be able to develop high thermal insulation properties and superior bendability.

Examples of a supporting member include a film-formed supporting member, a sheet-formed supporting member, a foil-formed supporting member, and a porous supporting member.

A film-formed supporting member is a formed product of a polymeric source material formed into a thin film, and examples thereof include an organic film, such as PET, and polyimide, and a glass film (including a metal vapor deposited film).

A sheet-formed supporting member is a formed product of at least one of fibrous source material selected from a group consisting of an organic material, an inorganic material, and a metallic material, and examples thereof include paper, nonwoven fabric (including a glass mat), organic fiber cloth, and glass cloth.

A foil-formed supporting member is a formed product of a metal source material formed into a thin film, and examples thereof include an aluminum foil, and a copper foil.

A porous supporting member is a product having a porous structure formed from at least one of source materials selected from the group consisting of an organic material, an inorganic material, and a metallic material, and examples thereof include a porous organic material such as a polyurethane foam, a porous inorganic material such as a zeolite sheet, and a porous metallic material, such as a porous metal sheet, and a porous aluminum sheet.

A supporting member with an aerogel composite may be produced, for example, as follows. Firstly, a sol is prepared according to the step of preparing sol. The sol is coated using a film applicator, etc. on a supporting member, or impregnated into a supporting member, and then a film-formed supporting member with a wet gel is obtained according to the step of preparing a wet gel. The obtained film-formed supporting member with a wet gel is subjected to washing and (according to need) solvent exchange according to the step of washing and solvent exchange, and further to drying according to the step of drying to obtain a supporting member with an aerogel composite.

The thickness of an aerogel composite formed on a film-formed supporting member or a foil-formed supporting member may be 1 to 200 μm, or may be also 10 to 100 μm, or even 30 to 80 μm. When the thickness is 1 μm or more, a good thermal insulation properties may be obtained more easily, and when the same is 200 μm or less, favorable flexibility may be obtained more easily.

An aerogel composite according to the Embodiment described hereinabove has superior thermal insulation properties and flexibility as was hardly achievable by a conventional aerogel, owing to an aerogel component and a silica particle contained. Especially owing to superior flexibility, it becomes possible to form an aerogel composite layer on a film-formed supporting member and a foil-formed supporting member, which has been heretofore hardly achievable. Therefore, a supporting member with an aerogel composite according to the Embodiment has high thermal insulation properties and superior bendability. Also in the mode in which a sol is impregnated in a sheet-formed supporting member or a porous supporting member, detachment of an aerogel composite powder during handling after drying may be suppressed.

Owing to such advantages, an aerogel composite and a supporting member with an aerogel composite according to the Embodiment may be applied to uses as a thermal insulation material in a building field, an automobile field, household electrical appliances, a semiconductor field, industrial facilities, etc. Further, an aerogel composite according to the Embodiment may be utilized, in addition to uses as a thermal insulation material, as a paint additive, cosmetics, an anti-blocking agent, a catalyst support, etc.

<Thermal Insulation Material>

A thermal insulation material according to the Embodiment comprises an aerogel composite described hereinabove, and has high thermal insulation properties and superior bendability. In this regard, an aerogel composite obtained by the method for producing an aerogel composite may be used as it is (if necessary it may be processed to a predetermined shape) as a thermal insulation material.

EXAMPLES

Next, the present invention will be described in more detail by way of Examples below, but these Examples will not be limiting the present invention.

Example 1

[Wet Gel, Aerogel Composite]

80.0 parts by mass of methyltrimethoxysilane LS-530 (made by Shin-Etsu Chemical Co., Ltd., product name: hereinafter, abbreviated to "MTMS") and 20.0 parts by mass of dimethyldimethoxysilane LS-520 (made by Shin-Etsu Chemical Co., Ltd., product name: hereinafter, abbreviated to "DMDMS") as silicon compounds, 100.0 parts by mass of PL-20 (the details of PL-20 are described in Table 1. This is true of the silica particle-containing raw material) as a silica particle-containing raw material, 40.0 parts by mass of water, and 80.0 parts by mass of methanol were mixed; 0.10 parts by mass of acetic acid as an acid catalyst was added to this mixture; the mixture was reacted at 25° C. for 2 hours to yield Sol 1. 40.0 parts by mass of 5% aqueous ammonia as a base catalyst was added to Sol 1 obtained; Sol 1 was gelated at 60° C. and was aged at 80° C. for 24 hours to yield Wet gel 1.

Subsequently, Wet gel 1 obtained was immersed in 2500.0 parts by mass of methanol, and was washed at 60° C. over 12 hours. This washing operation was performed three times while methanol was replaced with fresh one. Next, the washed wet gel was immersed in 2500.0 parts by mass of heptane, which is a low surface tension solvent, and solvent exchange was performed at 60° C. over 12 hours. This solvent exchange operation was performed three times while heptane was replaced with fresh one. The washed and solvent-exchanged wet gel was dried under normal pressure at 40° C. for 96 hours, and then was dried at 150° C. for 2 hours to yield Aerogel composite 1 having a structure represented by the above formulae (6) and (7).

[Support Member with Aerogel Composite]

Film-Like Supporting Member with Aerogel Composite

Sol 1 above was applied onto a polyethylene terephthalate film measuring 300 mm (in length)×270 mm (in width)×12 μm (in thickness) using a film applicator (made by TESTER SANGYO CO. LTD., PI-1210) such that the thickness after gelation was 40 μm; Sol 1 was gelated at 60° C. for 3 hours, and was aged at 80° C. for 24 hours to yield Film-like supporting member 1 with a wet gel.

Subsequently, Film-like supporting member 1 with a wet gel obtained was immersed in 100 mL of methanol, and was washed at 60° C. over 2 hours. Next, the washed film-like supporting member with a wet gel was immersed in 100 mL of methyl ethyl ketone to undergo solvent exchange at 60° C. over 2 hours. This solvent exchange operation was performed twice while methyl ethyl ketone was replaced with fresh one. The washed and solvent-exchanged film-like supporting member with a wet gel was dried under normal pressure at 120° C. for 6 hours to yield Film-like supporting member 1 with an aerogel composite.

Sheet-Like Supporting Member with Aerogel Composite

Sol 1 above was impregnated into an E glass cloth measuring 300 mm (in length)×270 mm (in width)×100 μm (in thickness) such that the thickness of the sheet-like supporting member after gelation was 120 μm; Sol 1 was gelated at 60° C. for 3 hours, and was aged at 80° C. for 24 hours to yield Sheet-like supporting member 1 with a wet gel.

Subsequently, Sheet-like supporting member 1 with a wet gel obtained was immersed in 300 mL of methanol, and was washed at 60° C. over 2 hours. Next, the washed sheet-like supporting member with a wet gel was immersed in 300 mL of methyl ethyl ketone to undergo solvent exchange at 60° C. over 2 hours. This solvent exchange operation was performed twice while methyl ethyl ketone was replaced with fresh one. The washed and solvent-exchanged sheet-like supporting member with a wet gel was dried under normal pressure at 120° C. for 8 hours to yield Sheet-like supporting member 1 with an aerogel composite.

Foil-Like Supporting Member with Aerogel Composite

Sol 1 above was applied onto an aluminum foil measuring 300 mm (in length)×270 mm (in width)×12 μm (in thickness) using a film applicator such that the thickness thereof after gelation was 40 μm; Sol 1 was gelated at 60° C. for 3 hours, and was aged at 80° C. for 24 hours to yield Foil-like supporting member 1 with a wet gel.

Subsequently, Foil-like supporting member 1 with a wet gel obtained was immersed in 100 mL of methanol, and was washed at 60° C. over 2 hours. Next, the washed foil-like supporting member with a wet gel was immersed in 100 mL of methyl ethyl ketone to undergo solvent exchange at 60° C. over 2 hours. This solvent exchange operation was performed twice while methyl ethyl ketone was replaced with fresh one. The washed and solvent-exchanged foil-like supporting member with a wet gel was dried under normal pressure at 120° C. for 6 hours to yield Foil-like supporting member 1 with an aerogel composite.

Porous Supporting Member with Aerogel Composite

Sol 1 above was impregnated into a soft urethane foam measuring 300 mm (in length)×270 mm (in width)×10 mm (in thickness) such that the thickness of the porous supporting member after gelation was 10 mm; Sol 1 was then gelated at 60° C. for 3 hours, and was aged at 80° C. for 24 hours to yield Porous supporting member 1 with a wet gel.

Subsequently, Porous supporting member 1 with a wet gel was immersed in 300 mL of methanol, and was washed at 60° C. over 2 hours. Next, the washed porous supporting member with a wet gel was immersed in 300 mL of methyl ethyl ketone to undergo solvent exchange at 60° C. over 2 hours. This solvent exchange operation was performed twice while methyl ethyl ketone was replaced with fresh one. The washed and solvent-exchanged porous supporting member with a wet gel was dried under normal pressure at 120° C. for 10 hours to yield Porous supporting member 1 with an aerogel composite.

Example 2

[Wet Gel, Aerogel Composite]

60.0 parts by mass of MTMS and 40.0 parts by mass of DMDMS as silicon compounds, 100.0 parts by mass of PL-2L as a silica particle-containing raw material, 40.0 parts by mass of water, and 80.0 parts by mass of methanol were mixed; 0.10 parts by mass of acetic acid as an acid catalyst was added thereto; the mixture was reacted at 25° C. for 2 hours to yield Sol 2. 40.0 parts by mass of 5% aqueous ammonia as a base catalyst was added to Sol 2 obtained; Sol 2 was gelated at 60° C., and was aged at 80° C. for 24 hours to yield Wet gel 2. Subsequently, using Wet gel 2 obtained, Aerogel composite 2 having a structure represented by the above formulae (6) and (7) was obtained in the same manner as in Example 1.

[Supporting Members with Aerogel Composite]

Using Sol 2 above, Supporting member 2 with an aerogel composite, Sheet-like supporting member 2 with an aerogel composite, Foil-like supporting member 2 with an aerogel composite, and Porous supporting member 2 with an aerogel composite were obtained in the same manner as in Example 1.

Example 3

[Wet Gel, Aerogel Composite]

60.0 parts by mass of MTMS and 40.0 parts by mass of bis(trimethoxysilyl)hexane "KBM-3066" (made by Shin-Etsu Chemical Co., Ltd., product name) as silicon compounds, 57.0 parts by mass of ST-OZL-35 as a silica particle-containing raw material, 83.0 parts by mass of water, and 80.0 parts by mass of methanol were mixed; 0.10 parts by mass of acetic acid as an acid catalyst and 20.0 parts by mass of cetyltrimethylammonium bromide (made by Wako Pure Chemical Industries, Ltd.: hereinafter, abbreviated to "CTAB") as a cationic surfactant were added to the mixture; then, the mixture was reacted at 25° C. for 2 hours to yield Sol 3. 40.0 parts by mass of 5% aqueous ammonia as a base catalyst was added to Sol 3 obtained; Sol 3 was gelated at 60° C., and was aged at 80° C. for 24 hours to yield Wet gel 3. Subsequently, using Wet gel 3 obtained, Aerogel composite 3 having a structure represented by the above formulae (6) and (8) was obtained in the same manner as in Example 1.

[Supporting Members with Aerogel Composite]

Using Sol 3 above, Film-like supporting member 3 with an aerogel composite, Sheet-like supporting member 3 with an aerogel composite, Foil-like supporting member 3 with an aerogel composite, and Porous supporting member 3 with an aerogel composite were obtained in the same manner as in Example 1.

Example 4

[Wet Gel, Aerogel Composite]

100.0 parts by mass of PL-2L as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 70.0 parts by mass of MTMS and 30.0 parts by mass of DMDMS as silicon compounds were added to the mixture; the mixture was reacted at 25° C. for 2 hours to yield Sol 4. Sol 4 obtained was gelated at 60° C., and was aged at 80° C. for 24 hours to yield Wet gel 4. Subsequently, using Wet gel 4 obtained, Aerogel composite 4 having a structure represented by the above formulae (6) and (7) was obtained in the same manner as in Example 1.

[Supporting Members with Aerogel Composite]

Using Sol 4 above, Film-like supporting member 4 with an aerogel composite, Sheet-like supporting member 4 with an aerogel composite, Foil-like supporting member 4 with an aerogel composite, and Porous supporting member 4 with an aerogel composite were obtained in the same manner as in Example 1.

Example 5

[Wet Gel, Aerogel Composite]

200.0 parts by mass of ST-OXS as a silica particle-containing raw material, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 40.0 parts by mass of DMDMS as silicon compounds were added to the mixture; the mixture was reacted at 25° C. for 2 hours to yield Sol 5. Sol 5 obtained was gelated at 60° C., and was aged at 80° C. for 24 hours to yield Wet gel 5. Subsequently, using Wet gel 5 obtained, Aerogel composite 5 having a structure represented by the above formulae (6) and (7) was obtained in the same manner as in Example 1.

[Supporting Members with Aerogel Composite]

Using Sol 5 above, Film-like supporting member 5 with an aerogel composite, Sheet-like supporting member 5 with an aerogel composite, Foil-like supporting member 5 with an aerogel composite, and Porous supporting member 5 with an aerogel composite were obtained in the same manner as in Example 1.

Example 6

[Wet Gel, Aerogel Composite]

100.0 parts by mass of PL-2L-D as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 40.0 parts by mass of DMDMS as silicon compounds were added to the mixture; the mixture was reacted at 25° C. for 2 hours to yield Sol 6. Sol 6 obtained was gelated at 60° C., and was aged at 80° C. for 24 hours to yield Wet gel 6. Subsequently, using Wet gel 6 obtained, Aerogel composite 6 having a structure represented by the above formulae (6) and (7) was obtained in the same manner as in Example 1.

[Supporting Members with Aerogel Composite]

Using Sol 6 above, Film-like supporting member 6 with an aerogel composite, Sheet-like supporting member 6 with an aerogel composite, Foil-like supporting member 6 with an aerogel composite, and Porous supporting member 6 with an aerogel composite were obtained in the same manner as in Example 1.

Example 7

[Wet Gel, Aerogel Composite]

87.0 parts by mass of PL-7 as a silica particle-containing raw material, 113.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 40.0 parts by mass of DMDMS as silicon compounds were added to the mixture, and the mixture was reacted at 25° C. for 2 hours to yield Sol 7. Sol 7 obtained was gelated at 60° C., and was aged at 80° C. for 24 hours to yield Wet gel 7. Subsequently, using Wet gel 7 obtained, Aerogel composite 7 having a structure represented by the above formulae (6) and (7) was obtained in the same manner as in Example 1.

[Supporting Members with Aerogel Composite]

Using Sol 7 above, Film-like supporting member 7 with an aerogel composite, Sheet-like supporting member 7 with an aerogel composite, Foil-like supporting member 7 with an aerogel composite, and Porous supporting member 7 with an aerogel composite were obtained in the same manner as in Example 1.

Example 8

[Wet Gel, Aerogel Composite]

167.0 parts by mass of PL-1 as a silica particle-containing raw material, 33.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 40.0 parts by mass of DMDMS as silicon compounds were added to the mixture, and the mixture was reacted at 25° C. for 2 hours to yield Sol 8. Sol 8 obtained was gelated at 60° C., and was aged at 80° C. for 24 hours to yield Wet gel 8. Subsequently, using Wet gel 8 obtained, Aerogel composite 8 having a structure represented by the above formulae (6) and (7) was obtained in the same manner as in Example 1.

[Supporting Members with Aerogel Composite]

Using Sol 8 above, Film-like supporting member 8 with an aerogel composite, Sheet-like supporting member 8 with an aerogel composite, Foil-like supporting member 8 with an aerogel composite, and Porous supporting member 8 with an aerogel composite were obtained in the same manner as in Example 1.

Example 9

[Wet Gel, Aerogel Composite]

10.0 parts by mass of AEROSIL 90 as a silica particle-containing raw material, 190.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 40.0 parts by mass of DMDMS as silicon compounds were added to the mixture, and the mixture was reacted at 25° C. for 2 hours to yield Sol 9. Sol 9 obtained was gelated at 60° C., and was aged at 80° C. for 24 hours to yield Wet gel 9. Subsequently, using Wet gel 9 obtained, Aerogel composite 9 having a structure represented by the above formulae (6) and (7) was obtained in the same manner as in Example 1.

[Supporting Members with Aerogel Composite]

Using Sol 9 above, Film-like supporting member 9 with an aerogel composite, Sheet-like supporting member 9 with an aerogel composite, Foil-like supporting member 9 with an aerogel composite, and Porous supporting member 9 with an aerogel composite were obtained in the same manner as in Example 1.

Example 10

[Wet Gel, Aerogel Composite]

10.0 parts by mass of SO—C2 as a silica particle-containing raw material, 190.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 40.0 parts by mass of bis(trimethoxysilyl)hexane as silicon compounds were added, and was reacted at 25° C. for 2 hours to yield Sol 10. Sol 10 obtained was gelated at 60° C., and was aged at 80° C. for 24 hours to yield Wet gel 10. Subsequently, using Wet gel 10 obtained, Aerogel composite 10 having a structure represented by the above formulae (6) and (8) was obtained in the same manner as in Example 1.

[Supporting Members with Aerogel Composite]

Using Sol 10 above, Film-like supporting member 10 with an aerogel composite, Sheet-like supporting member 10 with an aerogel composite, Foil-like supporting member 10 with an aerogel composite, and Porous supporting member 10 with an aerogel composite were obtained in the same manner as in Example 1.

Example 11

[Wet Gel, Aerogel Composite]

100.0 parts by mass of ST-OYL as a silica particle-containing raw material, 100.0 parts by mass of water, 0.10 parts by mass of acetic acid as an acid catalyst, 20.0 parts by mass of F-127 (made by BASF SE, product name), which is a block copolymer of polyoxyethylene and polyoxypropylene, as a nonionic surfactant, and 120.0 parts by mass of urea as a thermally hydrolyzable compound were mixed; 80.0 parts by mass of MTMS as a silicon compound, and 20.0 parts by mass of X-22-160AS as a polysiloxane compound having a structure represented by the above formula (4) were added to the mixture, and the mixture was reacted at 25° C. for 2 hours to yield Sol 11. Sol 11 obtained was gelated at 60° C., and was aged at 80° C. for 24 hours to yield Wet gel 11. Subsequently, using Wet gel 11 obtained, Aerogel composite 11 having a structure represented by the above formulae (1) and (6) was obtained in the same manner as in Example 1.

[Supporting Members with Aerogel Composite]

Using Sol 11 above, Film-like supporting member 11 with an aerogel composite, Sheet-like supporting member 11 with an aerogel composite, Foil-like supporting member 11 with an aerogel composite, and Porous supporting member 11 with an aerogel composite were obtained in the same manner as in Example 1.

Example 12

[Wet Gel, Aerogel Composite]

200.0 parts by mass of PL-06L as a silica particle-containing raw material, 0.10 parts by mass of acetic acid as an acid catalyst, 20.0 parts by mass of CTAB as a cationic surfactant, and 120.0 parts by mass of urea as a thermally hydrolyzable compound were mixed; 80.0 parts by mass of MTMS as a silicon compound and 20.0 parts by mass of polysiloxane compound having a structure represented by the above formula (5) and both terminals modified with a bifunctional alkoxy group (hereinafter, referred to as "Polysiloxane compound A") as a polysiloxane compound were added to the mixture, and the mixture was reacted at 25° C. for 2 hours to yield Sol 12. Sol 12 obtained was gelated at 60° C., and was aged at 80° C. for 24 hours to yield Wet gel 12. Subsequently, using Wet gel 12 obtained, Aerogel composite 12 having a structure represented by the above formulae (3) and (6) was obtained in the same manner as in Example 1.

The "Polysiloxane compound A" described above was synthesized as follows. 100.0 parts by mass of dimethylpolysiloxane XC96-723 having silanol groups at both terminals (made by Momentive Performance Materials Inc., product name), 181.3 parts by mass of methyltrimethoxysilane, and 0.50 parts by mass of t-butylamine were first mixed in a 1-liter 3-necked flask including a stirrer, a thermometer, and a Dimroth condenser to react the mixture at 30° C. for 5 hours. Subsequently, the reaction solution was heated under a reduced pressure of 1.3 kPa at 140° C. for 2 hours to remove volatile components, yielding a polysiloxane compound having both terminals modified with a bifunctional alkoxy group (Polysiloxane compound A).

[Supporting Members with Aerogel Composite]

Using Sol 12 above, Film-like supporting member 12 with an aerogel composite, Sheet-like supporting member 12 with an aerogel composite, Foil-like supporting member 12 with an aerogel composite, and Porous supporting member 12 with an aerogel composite were obtained in the same manner as in Example 1.

Example 13

[Wet Gel, Aerogel Composite]

100.0 parts by mass of PL-20 as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS as a silicon compound, and 40.0 parts by mass of a polysiloxane compound having a structure represented by the above formula (5) and both terminals modified with a trifunctional alkoxy group (hereinafter, referred to as "Polysiloxane compound B") as a polysiloxane compound were added to the mixture, the mixture was reacted at 25° C. for 2 hours to yield Sol 13. Sol 13 obtained was gelated at 60° C., and was aged at 80° C. for 24 hours to yield Wet gel 13. Subsequently, using Wet gel 13 obtained, Aerogel composite 13 having a structure represented by the above formulae (2) and (6) was obtained in the same manner as in Example 1.

The "Polysiloxane compound B" described above was synthesized as follows. 100.0 parts by mass of XC96-723, 202.6 parts by mass of tetramethoxysilane, and 0.50 parts by mass of t-butylamine were mixed in a 1-liter 3-necked flask including a stirrer, a thermometer, and a Dimroth condenser to react the mixture at 30° C. for 5 hours. Subsequently, the reaction solution was heated under a reduced pressure of 1.3 kPa at 140° C. for 2 hours to remove volatile components, yielding a polysiloxane compound having both terminals modified with a trifunctional alkoxy group (Polysiloxane compound B).

[Supporting Members with Aerogel Composite]

Using Sol 13 above, Film-like supporting member 13 with an aerogel composite, Sheet-like supporting member 13 with an aerogel composite, Foil-like supporting member 13 with an aerogel composite, and Porous supporting member 13 with an aerogel composite were obtained in the same manner as in Example 1.

Example 14

[Wet Gel, Aerogel Composite]

100.0 parts by mass of PL-20 as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 20.0 parts by mass of DMDMS as silicon compounds, and 20.0 parts by mass of X-22-160AS as a polysiloxane compound were added to the mixture; the mixture was reacted at 25° C. for 2 hours to yield Sol 14. Sol 14 obtained was gelated at 60° C., and was aged at 80° C. for 24 hours to yield Wet gel 14. Subsequently, using Wet gel 14 obtained, Aerogel composite 14 having a structure represented by the above formulae (1), (6), and (7) was obtained in the same manner as in Example 1.

[Supporting Members with Aerogel Composite]

Using Sol 14 above, Film-like supporting member 14 with an aerogel composite, Sheet-like supporting member 14 with an aerogel composite, Foil-like supporting member 14 with an aerogel composite, and Porous supporting member 14 with an aerogel composite were obtained in the same manner as in Example 1.

Example 15

[Wet Gel, Aerogel Composite]

100.0 parts by mass of PL-2L as a silica particle-containing raw material, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 20.0 parts by mass of DMDMS as silicon compounds, and 20.0 parts by mass of Polysiloxane compound A as a polysiloxane compound were added to the mixture; the mixture was reacted at 25° C. for 2 hours to yield Sol 15. Sol 15 obtained was gelated at 60° C., and was aged at 80° C. for 24 hours to yield Wet gel 15. Subsequently, using Wet gel 15 obtained, Aerogel composite 15 having a structure represented by the above formulae (3), (6), and (7) was obtained in the same manner as in Example 1.

[Supporting Members with Aerogel Composite]

Using Sol 15 above, Film-like supporting member 15 with an aerogel composite, Sheet-like supporting member 15 with an aerogel composite, Foil-like supporting member 15 with an aerogel composite, and Porous supporting member 15 with an aerogel composite were obtained in the same manner as in Example 1.

Example 16

[Wet Gel, Aerogel Composite]

143.0 parts by mass of ST-OZL-35 as a silica particle-containing raw material, 57.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 20.0 parts by mass of DMDMS as silicon compounds, and 20.0 parts by mass of Polysiloxane compound B as a polysiloxane compound were added to the mixture; the mixture was reacted at 25° C. for 2 hours to yield Sol 16. Sol 16 obtained was gelated at 60° C., and was aged at 80° C. for 24 hours to yield Wet gel 16. Subsequently, using Wet gel 16 obtained, Aerogel composite 16 having a structure represented by the above formulae (2), (6), and (7) was obtained in the same manner as in Example 1.

[Supporting Members with Aerogel Composite]

Using Sol 16 above, Film-like supporting member 16 with an aerogel composite, Sheet-like supporting member 16 with an aerogel composite, Foil-like supporting member 16 with an aerogel composite, and Porous supporting member 16 with an aerogel composite were obtained in the same manner as in Example 1.

Example 17

[Wet Gel, Aerogel Composite]

50.0 parts by mass of PL-2L and 50.0 parts by mass of PL-20 as silica particle-containing raw materials, 100.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 40.0 parts by mass of DMDMS as silicon compounds were added to the mixture, and the mixture was reacted at 25° C. for 2 hours to yield Sol 17. Sol 17 obtained was gelated at 60° C., and was aged at 80° C. for 24 hours to yield Wet gel 17. Subsequently, using Wet gel 17 obtained, Aerogel composite 17 having a structure represented by the above formulae (6) and (7) was obtained in the same manner as in Example 1.

[Supporting Members with Aerogel Composite]

Using Sol 17 above, Film-like supporting member 17 with an aerogel composite, Sheet-like supporting member 17 with an aerogel composite, Foil-like supporting member 17 with an aerogel composite, and Porous supporting member 17 with an aerogel composite were obtained in the same manner as in Example 1.

Example 18

[Wet Gel, Aerogel Composite]

100.0 parts by mass of PL-2L and 50.0 parts by mass of ST-OZL-35 as a silica particle-containing raw materials, 50.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 20.0 parts by mass of DMDMS as silicon compounds, and 20.0 parts by mass of Polysiloxane compound A as a polysiloxane compound were added to the mixture; the mixture was reacted at 25° C. for 2 hours to yield Sol 18. Sol 18 obtained was gelated at 60° C., and was aged at 80° C. for 24 hours to yield Wet gel 18. Subsequently, using Wet gel 18 obtained, Aerogel composite 18 having a structure represented by the above formulae (3), (6), and (7) was obtained in the same manner as in Example 1.

[Supporting Members with Aerogel Composite]

Using Sol 18 above, Film-like supporting member 18 with an aerogel composite, Sheet-like supporting member 18 with an aerogel composite, Foil-like supporting member 18 with an aerogel composite, and Porous supporting member 18 with an aerogel composite were obtained in the same manner as in Example 1.

Example 19

[Wet Gel, Aerogel Composite]

Wet gel 17 obtained above was immersed in 2500.0 parts by mass of methanol, and was washed at 60° C. over 12 hours. This washing operation was performed three times while methanol was replaced with fresh one. Next, the washed wet gel was immersed in 2500.0 parts by mass of 2-propanol to undergo solvent exchange at 60° C. over 12 hours. This solvent exchange operation was performed three times while 2-propanol was replaced with new one.

Next, supercritical drying of the solvent-exchanged wet gel was performed. An autoclave was filled with 2-propanol, and the solvent-exchanged wet gel was placed therein. Liquefied carbon dioxide gas was then fed into the autoclave to fill the autoclave with the mixture of the dispersive medium 2-propanol and carbon dioxide. Subsequently, heating was performed and pressure was increased such that the environment inside the autoclave was 80° C. and 14 MPa, and the carbon dioxide in a supercritical state was sufficiently circulated through the inside of the autoclave; then, the pressure was reduced to remove 2-propanol and carbon dioxide contained in the gel. Aerogel composite 19 having the structure represented by the above formulae (6) and (7) was thus obtained.

Example 20

[Wet Gel, Aerogel Composite]

Using Wet gel 18 obtained above, Aerogel composite 20 having a structure represented by the above formulae (3), (6), and (7) was obtained in the same manner as in Example 19.

Example 21

[Wet Gel, Aerogel Composite]

Wet gel 15 obtained above was immersed in 2500.0 parts by mass of methanol, and was washed at 60° C. over 12 hours. This washing operation was performed three times while methanol was replaced with new one. Next, without performing solvent exchange, the washed wet gel was dried under normal pressure at 60° C. for 2 hours, and at 100° C. for 3 hours; subsequently, the wet gel was further dried at 150° C. for 2 hours to yield Aerogel composite 21 having a structure represented by the above formulae (3), (6), and (7).

[Supporting Members with Aerogel Composite]

Each of the supporting members with a wet gel obtained using Wet gel 15 described above was immersed in 100 mL of methanol, and was washed at 60° C. over 2 hours. Next, the washed supporting member with a wet gel was dried under normal pressure at 60° C. for 30 minutes, and at 100° C. for 1 hour. Film-like supporting member 21 with an aerogel composite, Sheet-like supporting member 21 with an aerogel composite, Foil-like supporting member 21 with an aerogel composite, and Porous supporting member 21 with an aerogel composite were thus obtained.

Example 22

[Wet Gel, Aerogel Composite]

Using Wet gel 16 obtained above, Aerogel composite 22 having a structure represented by the above formulae (2), (6), and (7) was obtained in the same manner as in Example 21.

[Supporting Members with Aerogel Composite]

Using supporting member with a wet gel obtained using Wet gel 16 described above, Film-like supporting member 22 with an aerogel composite, Sheet-like supporting member 22 with an aerogel composite, Foil-like supporting member 22 with an aerogel composite, and Porous supporting member 22 with an aerogel composite were obtained in the same manner as in Example 21.

Comparative Example 1

[Wet Gel, Aerogel]

200.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 100.0 parts by mass of MTMS as a silicon compound was added to the mixture; the mixture was reacted at 25° C. for 2 hours to yield Sol 1C. Sol 1C obtained was gelated at 60° C., and was aged at 80° C. for 24 hours to yield Wet gel 1C. Subsequently, using Wet gel 1C obtained, Aerogel 1C was obtained in the same manner as in Example 1.

[Supporting Members with Aerogel]

Using Sol 1C above, Film-like supporting member 1C with an aerogel, Sheet-like supporting member 1C with an aerogel, Foil-like supporting member 1C with an aerogel, and Porous supporting member 1C with an aerogel were obtained in the same manner as in Example 1.

Comparative Example 2

[Wet Gel, Aerogel]

200.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 80.0 parts by mass of MTMS and 20.0 parts by mass of DMDMS as silicon compounds were added to the mixture; the mixture was reacted at 25° C. for 2 hours to yield Sol 2C. Sol 2C obtained was gelated at 60° C., and was aged at 80° C. for 24 hours to yield Wet gel 2C. Subsequently, using Wet gel 2C obtained, Aerogel 2C was obtained in the same manner as in Example 1.

[Supporting Members with Aerogel]

Using Sol 2C above, Film-like supporting member 2C with an aerogel, Sheet-like supporting member 2C with an aerogel, Foil-like supporting member 2C with an aerogel, and Porous supporting member 2C with an aerogel were obtained in the same manner as in Example 1.

Comparative Example 3

[Wet Gel, Aerogel]

200.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 70.0 parts by mass of MTMS and 30.0 parts by mass of DMDMS as silicon compounds were added to the mixture; the mixture was reacted at 25° C. for 2 hours to yield Sol 3C. Sol 3C obtained was gelated at 60° C., and was aged at 80° C. for 24 hours to yield Wet gel 3C. Subsequently, using Wet gel 3C obtained, Aerogel 3C was obtained in the same manner as in Example 1.

[Supporting Members with Aerogel]

Using Sol 3C above, Film-like supporting member 3C with an aerogel, Sheet-like supporting member 3C with an aerogel, Foil-like supporting member 3C with an aerogel, and Porous supporting member 3C with an aerogel were obtained in the same manner as in Example 1.

Comparative Example 4

[Wet Gel, Aerogel]

200.0 parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed; 60.0 parts by mass of MTMS and 40.0 parts by mass of DMDMS as silicon compounds were added to the mixture, and the mixture was reacted at 25° C. for 2 hours to yield Sol 4C. Sol 4C obtained was gelated at 60° C., and was aged at 80° C. for 24 hours to yield Wet gel 4C. Subsequently, using Wet gel 4C obtained, Comparative Example Aerogel 4C was obtained in the same manner as in Example 1.

[Supporting Members with Aerogel]

Using Sol 4C above, Film-like supporting member 4C with an aerogel, Sheet-like supporting member 4C with an aerogel, Foil-like supporting member 4C with an aerogel, and Porous supporting member 4C with an aerogel were obtained in the same manner as in Example 1.

The modes of the silica particle-containing raw materials in Examples are collectively shown in Table 1. The drying method, the types of Si raw materials (silicon compounds and polysiloxane compounds) and the amounts thereof added, and the amount of the silica particle-containing raw material added in Examples and Comparative Examples are collectively shown in Table 2.

TABLE 1

| | Silica particle-containing raw material | | | | | |
|---|---|---|---|---|---|---|
| | | | Silica particle | | | |
| | Type | Manufacturer | Type | Shape | Average primary particle diameter (nm) | solid content (% by weight) |
| Example 1 | PL-20 | FUSO CHEMICAL CO., LTD. | Colloidal silica | Spherical | 200 | 20 |
| Example 2 | PL-2L | FUSO CHEMICAL CO., LTD. | Colloidal silica | Spherical | 20 | 20 |
| Example 3 | ST-OZL-35 | Nissan Chemical Industries, Ltd. | Colloidal silica | Spherical | 100 | 35 |
| Example 4 | PL-2L | FUSO CHEMICAL CO., LTD. | Colloidal silica | Spherical | 20 | 20 |
| Example 5 | ST-OXS | Nissan Chemical Industries, Ltd. | Colloidal silica | Spherical | 5 | 10 |
| Example 6 | PL-2L-D | FUSO CHEMICAL CO., LTD. | Colloidal silica | Spherical (Anion reformed surface) | 20 | 20 |
| Example 7 | PL-7 | FUSO CHEMICAL CO., LTD. | Colloidal silica | Cocoon-shaped | 75 | 23 |
| Example 8 | PL-1 | FUSO CHEMICAL CO., LTD. | Colloidal silica | Associated | 15 | 12 |
| Example 9 | AEROSIL90 | NIPPON AEROSIL K.K. | Fumed silica | Spherical | 20 | 100 |
| Example 10 | SO-C2 | Admatechs Company Limited | Fused silica | Spherical | 500 | 100 |
| Example 11 | ST-OYL | Nissan Chemical Industries, Ltd. | Colloidal silica | Spherical | 70 | 20 |
| Example 12 | PL-06L | FUSO CHEMICAL CO., LTD. | Colloidal silica | Spherical | 7 | 6 |
| Example 13 | PL-20 | FUSO CHEMICAL CO., LTD. | Colloidal silica | Spherical | 200 | 20 |
| Example 14 | PL-20 | FUSO CHEMICAL CO., LTD. | Colloidal silica | Spherical | 200 | 20 |
| Example 15 | PL-2L | FUSO CHEMICAL CO., LTD. | Colloidal silica | Spherical | 20 | 20 |
| Example 16 | ST-OZL-35 | Nissan Chemical Industries, Ltd. | Colloidal silica | Spherical | 100 | 35 |
| Example 17 | PL-2L PL-20 | FUSO CHEMICAL CO., LTD. | Colloidal silica | Spherical | 20 200 | 20 20 |
| Example 18 | PL-2L ST-OZL-35 | FUSO CHEMICAL CO., LTD. Nissan Chemical Industries, Ltd. | Colloidal silica | Spherical | 20 100 | 20 35 |
| Example 19 | PL-2L PL-20 | FUSO CHEMICAL CO., LTD. | Colloidal silica | Spherical | 20 200 | 20 20 |
| Example 20 | PL-2L ST-OZL-35 | FUSO CHEMICAL CO., LTD. Nissan Chemical Industries, Ltd. | Colloidal silica | Spherical | 20 100 | 20 35 |
| Example 21 | PL-2L | FUSO CHEMICAL CO., LTD. | Colloidal silica | Spherical | 20 | 20 |
| Example 22 | ST-OZL-35 | Nissan Chemical Industries, Ltd. | Colloidal silica | Spherical | 100 | 35 |

TABLE 2

| | | Si raw material | | Silica particle-containing raw material |
|---|---|---|---|---|
| | Drying method | Type | Amount added (part by weight) | Amount added (part by weight) |
| Example 1 | Normal pressure | MTMS DMDMS | 80.0 20.0 | 100 |
| Example 2 | Normal pressure | MTMS DMDMS | 60.0 40.0 | 100 |
| Example 3 | Normal pressure | MTMS Bis(trimethoxysilyl)hexane | 60.0 40.0 | 57 |
| Example 4 | Normal pressure | MTMS DMDMS | 70.0 30.0 | 100 |

TABLE 2-continued

|  | | Si raw material | | Silica particle-containing raw material |
|---|---|---|---|---|
|  | Drying method | Type | Amount added (part by weight) | Amount added (part by weight) |
| Example 5 | Normal pressure | MTMS<br>DMDMS | 60.0<br>40.0 | 200 |
| Example 6 | Normal pressure | MTMS<br>DMDMS | 60.0<br>40.0 | 100 |
| Example 7 | Normal pressure | MTMS<br>DMDMS | 60.0<br>40.0 | 87 |
| Example 8 | Normal pressure | MTMS<br>DMDMS | 60.0<br>40.0 | 167 |
| Example 9 | Normal pressure | MTMS<br>DMDMS | 60.0<br>40.0 | 10 |
| Example 10 | Normal pressure | MTMS<br>Bis(trimethoxysilyl)hexane | 60.0<br>40.0 | 10 |
| Example 11 | Normal pressure | MTMS<br>X-22-160AS | 80.0<br>20.0 | 100 |
| Example 12 | Normal pressure | MTMS<br>Polysiloxane compound A | 80.0<br>20.0 | 200 |
| Example 13 | Normal pressure | MTMS<br>Polysiloxane compound B | 60.0<br>40.0 | 100 |
| Example 14 | Normal pressure | MTMS<br>DMDMS<br>X-22-160AS | 60.0<br>20.0<br>20.0 | 100 |
| Example 15 | Normal pressure | MTMS<br>DMDMS<br>Polysiloxane compound A | 60.0<br>20.0<br>20.0 | 100 |
| Example 16 | Normal pressure | MTMS<br>DMDMS<br>Polysiloxane compound B | 60.0<br>20.0<br>20.0 | 143 |
| Example 17 | Normal pressure | MTMS<br>DMDMS | 60.0<br>40.0 | 50 (PL-2L)<br>50 (PL-20) |
| Example 18 | Normal pressure | MTMS<br>DMDMS<br>Polysiloxane compound A | 60.0<br>20.0<br>20.0 | 100 (PL-2L)<br>50 (ST-OZL-35) |
| Example 19 | Super-critical | MTMS<br>DMDMS | 60.0<br>40.0 | 50 (PL-2L)<br>50 (PL-20) |
| Example 20 | Super-critical | MTMS<br>DMDMS<br>Polysiloxane compound A | 60.0<br>20.0<br>20.0 | 100 (PL-2L)<br>50 (ST-OZL-35) |
| Example 21 | Normal pressure | MTMS<br>DMDMS<br>Polysiloxane compound A | 60.0<br>20.0<br>20.0 | 100 |
| Example 22 | Normal pressure | MTMS<br>DMDMS<br>Polysiloxane compound B | 60.0<br>20.0<br>20.0 | 143 |
| Comparative Example 1 | Normal pressure | MTMS | 100.0 | — |
| Comparative Example 2 | Normal pressure | MTMS<br>DMDMS | 80.0<br>20.0 | — |
| Comparative Example 3 | Normal pressure | MTMS<br>DMDMS | 70.0<br>30.0 | — |
| Comparative Example 4 | Normal pressure | MTMS<br>DMDMS | 60.0<br>40.0 | — |

[Evaluations]

The wet gels, the aerogel composites, and the supporting members with an aerogel composite obtained in Examples, and the wet gels, the aerogels, and the supporting members with an aerogel obtained in Comparative Examples were measured or evaluated under the following conditions. The gelation time in a step of generating a wet gel, and the results of evaluation about the states of the aerogel composite and aerogel during drying of the methanol-substituted gel under normal pressure, the thermal conductivity coefficient, the compression modulus, and the density of the aerogel composite and the aerogel are collectively shown in Table 3, and the results of evaluation of a 180° bending test of the supporting members with an aerogel composite and the supporting members with an aerogel are collectively shown in Table 4.

(1) Measurement of Gelation Time 30 mL of the sol obtained in each of Examples and Comparative Examples was transferred into a 100-mL airtight PP vessel, and was used as a sample for measurement. Next, using a homothermal dryer "DVS402" (made by Yamato Scientific Co., Ltd., product name) set at 60° C., the time from placement of the sample for measurement in the dryer to gelation was measured.

(2) States of Aerogel Composites and Aerogels During Drying of Methanol-Replaced Gel Under Normal Pressure 30.0 parts by mass of the wet gel obtained in each of Examples and Comparative Examples was immersed in 150.0 parts by mass of methanol, and was washed at 60° C. over 12 hours. This washing operation was performed three times while methanol was replaced with new one. Next, the washed wet gel was processed into a size of 100 mm×100 mm×100 mm using a blade having a blade angle of about 20 to 25 degrees, and was used as a sample before drying. Using a thermostat with a safety door "SPH(H)-202" (made by ESPEC Corp., product name), the sample before drying obtained was dried at 60° C. for 2 hours, and at 100° C. for 3 hours, and subsequently was further dried at 150° C. for 2 hours to yield a sample after drying (solvent evaporation rate and the like are not controlled in particular). Here, the volume shrinkage rates SV before and after drying of the sample were determined from the following expression. A volume shrinkage rate SV of 5% or less was evaluated as "no shrinkage" and a volume shrinkage rate SV of 5% or more was evaluated as "shrunk".

$$SV=(V_0-V_1)/V_0 \times 100$$

where $V_0$ represents the volume of the sample before drying, and $V_1$ represents the volume of the sample after drying.

(3) Measurement of Thermal Conductivity Coefficient

Using a blade having a blade angle of about 20 to 25 degrees, the aerogel composites and the aerogels were processed into a size of 150 mm×150 mm×100 mm, and were used as samples for measurement. Next, each sample was reshaped with a #1500 or more sandpaper when necessary to ensure the parallelism of the surfaces of the samples. The sample for measurement obtained was dried under atmospheric pressure at 100° C. for 30 minutes before the measurement of the thermal conductivity coefficient using a homothermal dryer "DVS402" (made by Yamato Scientific Co., Ltd., product name). Subsequently, the sample for measurement was transferred into a desiccator, and was cooled to 25° C. Thereby, samples for measurement of the thermal conductivity coefficient were obtained.

The measurement of the thermal conductivity coefficient was performed by a standard thermal conductivity coefficient measurement apparatus "HFM436 Lambda" (made by NETZSCH, product name). The measurement conditions were under atmospheric pressure at an average temperature of 25° C. Each of the samples for measurement obtained above was sandwiched between an upper heater and a lower heater under a load of 0.3 MPa; the temperature difference ΔT was set at 20° C.; the upper surface temperature and the lower surface temperature of the sample for measurement were measured while adjustment was performed with a guarded heater so as to obtain a one-dimensional heat flow. The thermal resistance $R_S$ of the sample for measurement was then determined from the following expression:

$$R_S = N((T_U - T_L)/Q) - R_O$$

where $T_U$ represents the upper surface temperature of the sample for measurement, $T_L$ represents the lower surface temperature of the sample for measurement, $R_O$ represents the contact thermal resistance at the interface between the upper and lower surfaces, and Q represents an output of a heat flux meter. N is a proportionality coefficient, which was preliminarily determined using calibration samples.

Using the thermal resistance $R_S$ obtained, the thermal conductivity coefficient λ of the sample for measurement was determined from the following expression:

$$\lambda = d/R_S$$

where d represents the thickness of the sample for measurement.

(4) Measurement of Compression Modulus

The aerogel composites and the aerogels were processed into 7.0 mm cubes (dices) using a blade having a blade angle of about 20 to 25 degrees, and were used as samples for measurement. Next, each sample was reshaped with a #1500 or more sandpaper when necessary to ensure the parallelism of the surfaces of the samples. Using a homothermal dryer "DVS402" (made by Yamato Scientific Co., Ltd., product name), the sample for measurement obtained was dried under atmospheric pressure at 100° C. for 30 minutes before the measurement. Next, the sample for measurement was transferred into a desiccator, and was cooled to 25° C. Thereby, the sample for measurement of compression modulus was obtained.

A compact desktop tester "EZTest" (made by SHI-MADZU Corporation, product name) was used as a measurement apparatus. A load cell 500N was used. An upper stainless steel platen (ϕ20 mm) and a lower stainless steel platen (ϕ118 mm) were used as jigs for measurement of compression modulus. The sample for measurement was set between the upper platen and the lower platen disposed in parallel to perform compression at a rate of 1 mm/min. The temperature for measurement was 25° C., and the measurement was terminated when a load of more than 500 N was applied or when the sample for measurement broke. Here, the strain ε was determined from the following expression:

$$\varepsilon = \Delta d/d1$$

where Δd represents a displacement (mm) of the thickness of the sample for measurement caused by the load, and d1 represents the thickness (mm) of the sample for measurement before the load was applied.

The compressive stress σ (MPa) was determined from the following expression:

$$\sigma = F/A$$

where F represents a compressive force (N), and A represents the cross-sectional area (mm$^2$) of the sample for measurement before the load was applied.

The compression modulus E (MPa) in the range of a compressive force of 0.1 to 0.2 N was determined from the following expression:

$$E = (\sigma_2 - \sigma_1)/(\varepsilon_2 - \varepsilon_1)$$

where $\sigma_1$ represents the compressive stress (MPa) measured at a compressive force of 0.1 N, $\sigma_2$ represents the compressive stress (MPa) measured at a compressive force of 0.2 N, $\varepsilon_1$ represents the compression strain measured at a compressive stress $\sigma_1$, and $\varepsilon_2$ represents the compression strain measured at a compressive stress $\sigma_2$.

(5) Measurement of Density and Porosity

In the aerogel composites and the aerogels, the density and porosity of continuous pores (through holes) in the form of a three-dimensional network was measured by mercury intrusion porosimetry according to DIN66133. The temperature for measurement was room temperature (25° C.), and a measurement apparatus AutoPore IV9520 (made by SHI-MADZU Corporation, product name) was used.

(6) Flex Resistance Test

The supporting members with an aerogel composite and the supporting members with an aerogel obtained in Examples (excluding Examples 19 and 20) and Comparative Examples were processed to have a width of 50 mm, and a mandrel test was performed on the aerogel composite layer according to JIS K5600-1. A mandrel tester made by Toyo Seiki Seisaku-sho, Ltd. was used. The presence/absence of crack and/or peel on the aerogel composite and aerogel layer when bent at a mandrel radius of 1 mm at 180° was visually observed. The samples having no occurrence of crack and/or peel were evaluated as "unbroken", and those having occurrence of crack and/or peel was evaluated as "broken".

TABLE 3

|  | Wet gel | | Aerogel composite (aerogel) | | | |
| --- | --- | --- | --- | --- | --- | --- |
|  | Gelation time [min] | State of gel after drying of methanol substituted gel under normal pressure | Thermal conductivity coefficient [W/m · K] | Compression modulus [Mpa] | Density [g/cm$^3$] | Porosity [%] |
| Example 1 | 60 | No shrinkage | 0.017 | 1.92 | 0.18 | 90.8 |
| Example 2 | 30 | No shrinkage | 0.030 | 0.44 | 0.19 | 85.3 |
| Example 3 | 60 | No shrinkage | 0.022 | 0.98 | 0.18 | 89.2 |
| Example 4 | 30 | No shrinkage | 0.027 | 1.37 | 0.19 | 86.1 |
| Example 5 | 60 | No shrinkage | 0.030 | 0.43 | 0.19 | 86.7 |
| Example 6 | 60 | No shrinkage | 0.030 | 0.51 | 0.19 | 86.5 |
| Example 7 | 30 | No shrinkage | 0.028 | 0.55 | 0.19 | 86.2 |
| Example 8 | 30 | No shrinkage | 0.030 | 0.42 | 0.19 | 86.4 |
| Example 9 | 30 | No shrinkage | 0.029 | 0.61 | 0.19 | 85.2 |
| Example 10 | 60 | No shrinkage | 0.024 | 0.92 | 0.20 | 89.0 |
| Example 11 | 60 | No shrinkage | 0.018 | 1.47 | 0.18 | 90.6 |
| Example 12 | 60 | No shrinkage | 0.018 | 1.68 | 0.18 | 91.2 |
| Example 13 | 60 | No shrinkage | 0.017 | 0.95 | 0.19 | 91.5 |
| Example 14 | 60 | No shrinkage | 0.025 | 0.87 | 0.19 | 89.8 |
| Example 15 | 30 | No shrinkage | 0.023 | 0.94 | 0.18 | 89.3 |

TABLE 3-continued

| | Wet gel | | Aerogel composite (aerogel) | | | |
|---|---|---|---|---|---|---|
| | Gelation time [min] | State of gel after drying of methanol substituted gel under normal pressure | Thermal conductivity coefficient [W/m · K] | Compression modulus [Mpa] | Density [g/cm³] | Porosity [%] |
| Example 16 | 60 | No shrinkage | 0.018 | 1.39 | 0.19 | 90.1 |
| Example 17 | 30 | No shrinkage | 0.028 | 0.46 | 0.19 | 86.2 |
| Example 18 | 30 | No shrinkage | 0.022 | 1.08 | 0.19 | 89.6 |
| Example 19 | 30 | — | 0.030 | 0.46 | 0.18 | 86.3 |
| Example 20 | 30 | — | 0.022 | 0.92 | 0.18 | 89.5 |
| Example 21 | 30 | No shrinkage | 0.023 | 0.94 | 0.18 | 89.3 |
| Example 22 | 60 | No shrinkage | 0.018 | 1.39 | 0.19 | 90.1 |
| Comparative Example 1 | 180 | Shrunk (cracked) | 0.017 | 7.40 | 0.17 | 91.2 |
| Comparative Example 2 | 180 | Shrunk (cracked) | 0.028 | 4.35 | 0.18 | 90.8 |
| Comparative Example 3 | 210 | Shrunk (cracked) | 0.041 | 1.25 | 0.18 | 86.8 |
| Comparative Example 4 | 240 | No shrinkage | 0.045 | 0.15 | 0.19 | 86.4 |

TABLE 4

| | Supporting member with aerogel composite (supporting member with aerogel) | | | |
|---|---|---|---|---|
| | Film-like supporting member Flex resistance test | Sheet-like supporting member Flex resistance test | Foil-like supporting member Flex resistance test | Porous supporting member Flex resistance test |
| Example 1 | Unbroken | Unbroken | Unbroken | Unbroken |
| Example 2 | Unbroken | Unbroken | Unbroken | Unbroken |
| Example 3 | Unbroken | Unbroken | Unbroken | Unbroken |
| Example 4 | Unbroken | Unbroken | Unbroken | Unbroken |
| Example 5 | Unbroken | Unbroken | Unbroken | Unbroken |
| Example 6 | Unbroken | Unbroken | Unbroken | Unbroken |
| Example 7 | Unbroken | Unbroken | Unbroken | Unbroken |
| Example 8 | Unbroken | Unbroken | Unbroken | Unbroken |
| Example 9 | Unbroken | Unbroken | Unbroken | Unbroken |
| Example 10 | Unbroken | Unbroken | Unbroken | Unbroken |
| Example 11 | Unbroken | Unbroken | Unbroken | Unbroken |
| Example 12 | Unbroken | Unbroken | Unbroken | Unbroken |
| Example 13 | Unbroken | Unbroken | Unbroken | Unbroken |
| Example 14 | Unbroken | Unbroken | Unbroken | Unbroken |
| Example 15 | Unbroken | Unbroken | Unbroken | Unbroken |
| Example 16 | Unbroken | Unbroken | Unbroken | Unbroken |
| Example 17 | Unbroken | Unbroken | Unbroken | Unbroken |
| Example 18 | Unbroken | Unbroken | Unbroken | Unbroken |
| Example 19 | — | — | — | — |
| Example 20 | — | — | — | — |
| Example 21 | Unbroken | Unbroken | Unbroken | Unbroken |
| Example 22 | Unbroken | Unbroken | Unbroken | Unbroken |
| Comparative Example 1 | Broken | Broken | Broken | Broken |
| Comparative Example 2 | Broken | Broken | Broken | Broken |
| Comparative Example 3 | Broken | Broken | Broken | Broken |
| Comparative Example 4 | Unbroken | Unbroken | Unbroken | Unbroken |

From Table 3, the aerogel composites of Examples had a short gelation time in the step of generating a wet gel, had high reactivity, and had favorable shrinkage resistance during drying using methanol substituted gel under normal pressure. In this evaluation, the aerogel composites of all of Examples showing favorable shrinkage resistance means an indication that excellent aerogel composites are obtained without performing the solvent exchange step.

It is read that the aerogel composites of Examples have a small thermal conductivity coefficient and a small compression modulus, and are excellent in both high thermal insulation properties and high flexibility. The supporting members with an aerogel composite of Examples had high flex resistance.

In contrast, Comparative Examples 1 to 3 had a long gelation time in the step of generating a wet gel, and the gels shrunk during drying under normal pressure using methanol substituted gel, causing crack on the surfaces thereof. One of the thermal conductivity coefficient and the flexibility was inferior. Furthermore, the supporting members with an aerogel easily broke because these were fragile against bending. While Comparative Example 4 had sufficient shrinkage resistance, flexibility, and flex resistance, it had a long gelation time, and a high thermal conductivity coefficient.

(7) SEM Observation

Figure 3:
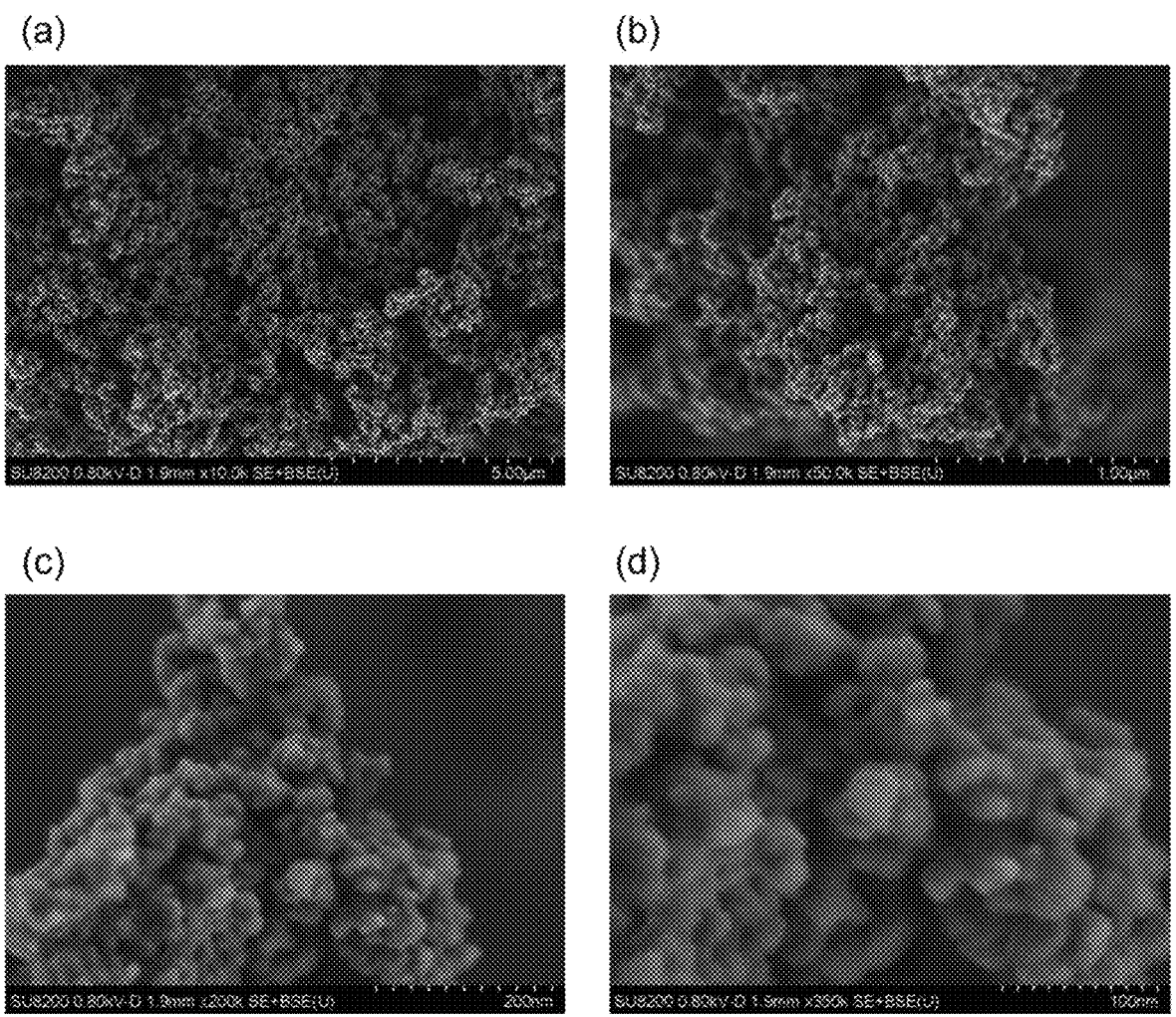
FIG. 3 is SEM images of observations of a surface of an aerogel composite in a foil-formed supporting member with an aerogel composite obtained in Example 15 at (a) 10000×, (b) 50000×, (c) 200000×, and (d) 350000× respectively.
Figure 4:
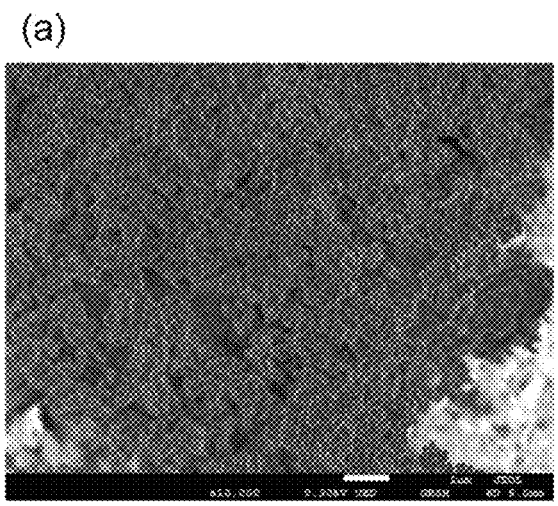
FIG. 4 is SEM images of observations of a surface of an aerogel composite in a foil-formed supporting member with an aerogel composite obtained in Example 16 at (a) 10000×, (b) 50000×, and (c) 200000× respectively.
Figure 4:
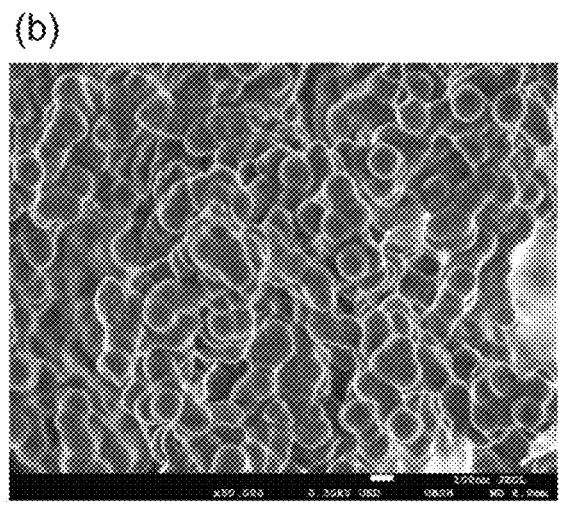
Figure 4:
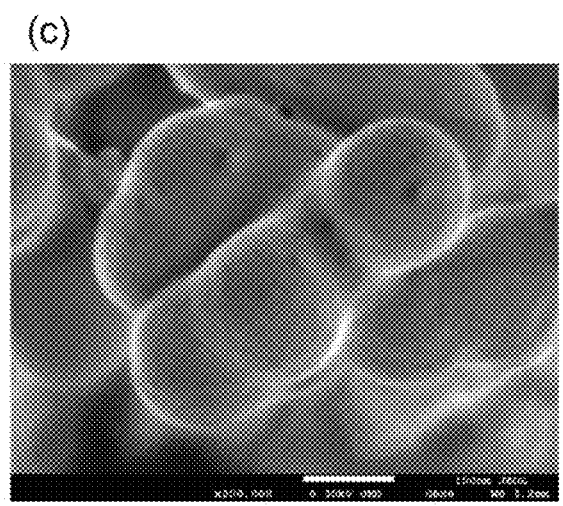

The surfaces of the aerogel composites in the foil-like supporting members with an aerogel composite obtained in Examples 15 and 16 were observed with an SEM. FIG. 3 illustrates SEM images of the surface of the aerogel composite in the foil-like supporting member with an aerogel composite obtained in Example 15 and measured at (a) 10000×, (b) 50000×, (c) 200000×, and (d) 350000×, respectively. FIG. 4 illustrates SEM images of the surface of the aerogel composite in the foil-like supporting member with an aerogel composite obtained in Example 16 and observed at (a) 10000×, (b) 50000×, and (c) 200000×, respectively.

As illustrated in FIG. 3, it was observed that the aerogel composite obtained in Example 15 had a three-dimensional network skeleton (a three-dimensionally microporous structure). The observed particles mainly had a particle diameter of about 20 nm derived from silica particles. It is observed that although a spherical aerogel component (aerogel particles) having a particle diameter smaller than those of the silica particles are also recognized, mainly the aerogel component is not spherical, and seems to coat the silica particles or function as a binder for the silica particles. It is inferred that because part of the aerogel component functions as a binder for the silica particles, as described above, the strength of the aerogel composite can be enhanced.

As illustrated in FIG. 4, it was observed that the aerogel composite obtained in Example 16 also had a three-dimensional network skeleton. However, its cluster structure is unique. In this Example, it is observed that the aerogel composite does not have a structure in which a particle is connected to another particle in a string of beads as in a normal aerogel, connection portions between particles are filled with the aerogel component (silicone) in a high density. Because the particle diameter of the particles derived from the silica particles is significantly larger than the particle diameter of the silica particles themselves, it is inferred that the silica particles are thickly coated with the aerogel component. Because in this Example, the aerogel component not only functions as a binder for the particles but also coats the entire cluster structure as described above, it is inferred that the strength of the aerogel composite can be further enhanced. Because ST-OZL-35 used in Example 16 is an acidic sol, the aerogel composite was prepared in the state where the pH in the system was low. For this reason, it is inferred that the generation rate of the aerogel component was reduced, and the aerogel component in the resulting aerogel composite barely had a particulate form.

Figure 5:
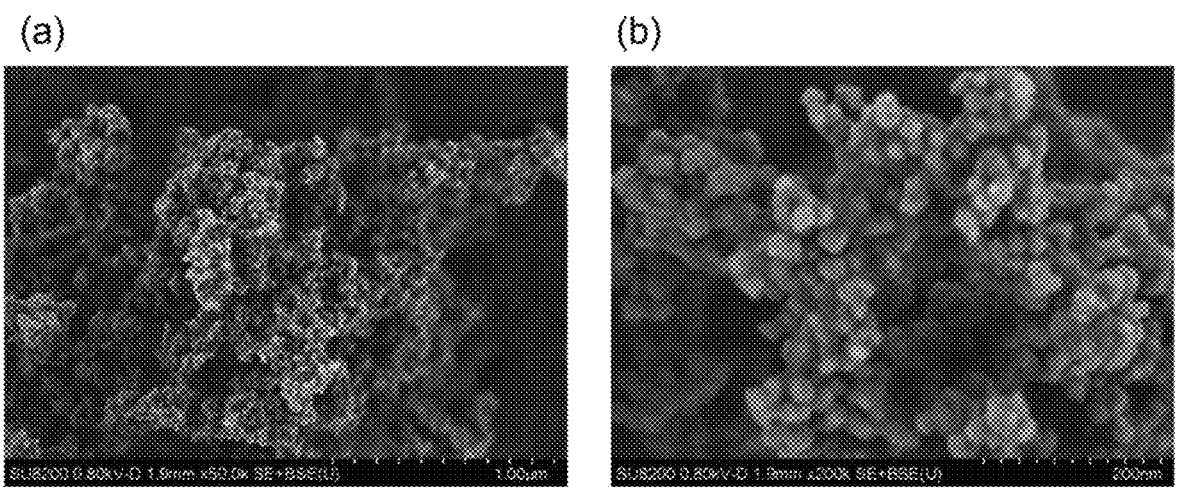
FIG. 5 is SEM images of observations of a surface of an aerogel composite in a foil-formed supporting member with an aerogel composite obtained in Example 23 at (a) 50000×, and (b) 200000× respectively.
Figure 6:
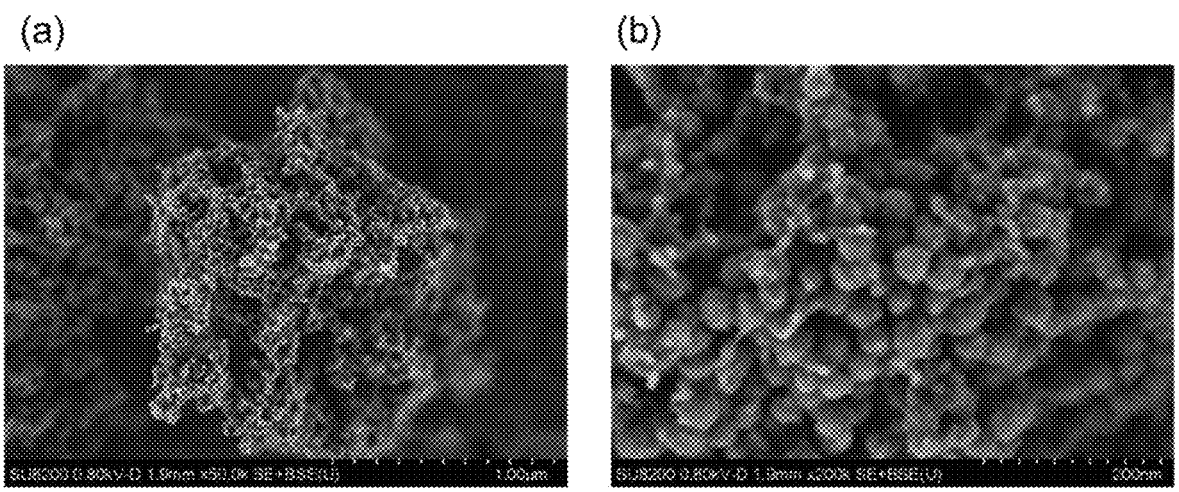
FIG. 6 is SEM images of observations of a surface of an aerogel composite in a foil-formed supporting member with an aerogel composite obtained in Example 24 at (a) 50000×, and (b) 200000× respectively.

Moreover, in Examples, foil-like supporting members with an aerogel composite were prepared, and the surfaces of the aerogel composites were observed with an SEM in the same manner as in Example 15. FIG. 5 illustrates SEM images of the surface of the aerogel composite in the foil-like supporting member with an aerogel composite obtained in Example 23 and observed at (a) 50000× and (b) 200000×, respectively. FIG. 6 illustrates SEM images of the surface of the aerogel composite in the foil-like supporting member with an aerogel composite obtained in Example 24 and observed at (a) 50000× and (b) 200000×, respectively.

Example 23

A foil-like supporting member with an aerogel composite was obtained in the same manner as in Example 15 except that a silica particle-containing raw material PL-3L (made by FUSO CHEMICAL CO., LTD., product name, a sol in which spherical colloidal silica having an average primary particle diameter of 35 nm is dispersed) was used.

Example 24

A foil-like supporting member with an aerogel composite was obtained in the same manner as in Example 15 except that a silica particle-containing raw material HL-3L (made by FUSO CHEMICAL CO., LTD., product name, a sol in which spherical colloidal silica having an average primary particle diameter of 30 nm is dispersed) was used.

In FIGS. 5 and 6, it was observed that the aerogel composites obtained using PL-3L and HL-3L, respectively, had three-dimensional network skeletons. In FIG. 5, particles having a particle diameter of about 40 nm and derived from silica particles and aerogel particles having a particle diameter of about 20 to 30 nm were mainly observed. In contrast, in FIG. 6, particles having a particle diameter of about 40 nm and derived from silica particles and aerogel particles having a particle diameter of about 10 nm were mainly observed. Compared with these, the particles derived from silica particles were more densely connected through the aerogel component in the aerogel composite obtained using PL-3L (FIG. 5) than in the aerogel composite obtained using HL-3L (FIG. 6). For this reason, it is inferred that PL-3L can enhance the strength of the aerogel composite more significantly than HL-3L does. It is inferred that because PL-3L has a larger number of silanol groups per gram than that of HL-3L, the generation rate of the aerogel component increased, and the aerogel component in the resulting aerogel composite was easy to grow into particles.

REFERENCE SIGNS LIST

1 . . . aerogel particle, 2 . . . silica particle, 3 . . . pore, 10 . . . aerogel composite, L . . . circumscribing rectangle.

The invention claimed is:

1. An aerogel composite comprising:
an aerogel component; and
silica particles, wherein at least a part of the silica particles is coated with the aerogel component,
wherein a content of the silica particles in the aerogel composite is 1 to 25 parts by mass with respect to the total amount of the aerogel composite as 100 parts by mass, and a thermal conductivity coefficient of the aerogel composite at atmospheric pressure and 25° C. is 0.03 W/m·K or less.

2. The aerogel composite according to claim 1 having a three-dimensional network skeleton formed from the aerogel component and the silica particles, and pores.

3. An aerogel composite comprising silica particles as a component constituting a three-dimensional network skeleton, wherein at least a part of the silica particles is coated with an aerogel component, and wherein a content of the silica particles in the aerogel composite is 1 to 25 parts by mass with respect to the total amount of the aerogel composite as 100 parts by mass, and a thermal conductivity coefficient of the aerogel composite at atmospheric pressure and 25° C. is 0.03 W/m·K or less.

4. The aerogel composite according to claim 3, wherein aerogel composite comprises a plurality of the silica particles arranged in a cluster coated with the aerogel component.

5. The aerogel composite according to claim 1 prepared by drying a wet gel formed from a sol comprising silica particles, and at least one selected from the group consisting of a silicon compound having a hydrolyzable functional group in a molecule and a hydrolysis product of the silicon compound.

6. The aerogel composite according to claim 5, wherein the sol further comprises at least one selected from the group consisting of a polysiloxane compound having a reactive group in a molecule and a hydrolysis product of the polysiloxane compound.

7. The aerogel composite according to claim 1, wherein an average primary particle diameter of the silica particles is 1 to 500 nm.

8. The aerogel composite according to claim 1, wherein a shape of the silica particles is spherical.

9. The aerogel composite according to claim 1, wherein the silica particles are amorphous silica particles.

10. The aerogel composite according to claim 9, wherein the amorphous silica particles are at least one selected from the group consisting of a fused silica particles, fumed silica particles, and colloidal silica particles.

11. The aerogel composite according to claim 5, wherein the drying is conducted at a temperature less than a critical point of a solvent used for the drying, and at an atmospheric pressure.

12. A supporting member with an aerogel composite, comprising the aerogel composite according to claim 1, and a supporting member carrying the aerogel composite.

13. A heat insulating material comprising the aerogel composite according to claim 1.

14. The aerogel composite according to claim 1, wherein the silica particles are coated with the aerogel component in a film form.

15. The aerogel composite according to claim 1, wherein aerogel composite comprises a plurality of the silica particles arranged in a cluster coated with the aerogel component.

16. The aerogel composite according to claim 15, wherein the aerogel component coats the entire cluster.

17. The aerogel composite according to claim 4, wherein the aerogel component coats the entire cluster.

* * * * *